United States Patent
Gu et al.

(10) Patent No.: US 10,618,992 B2
(45) Date of Patent: Apr. 14, 2020

(54) HYDROPHOBIC VINYLAMINE-CONTAINING POLYMER COMPOSITIONS AND THEIR USE IN PAPERMAKING APPLICATIONS

(71) Applicant: SOLENIS TECHNOLOGIES, L.P., Wilmington, DE (US)

(72) Inventors: Qu-Ming Gu, Wilmington, DE (US); Clement L. Brungardt, Wilmington, DE (US); Josette Servals Huynh-Ba, Wilmington, DE (US); Patrick Kovacs, Wilmington, DE (US); Ashley Lewis, Wilmington, DE (US)

(73) Assignee: SOLENIS TECHNOLOGIES, L.P., Wilmington, DE (US)

( * ) Notice: Subject to any disclaimer, the term of this patent is extended or adjusted under 35 U.S.C. 154(b) by 91 days.

(21) Appl. No.: 16/032,775

(22) Filed: Jul. 11, 2018

(65) Prior Publication Data
US 2019/0031802 A1    Jan. 31, 2019

Related U.S. Application Data

(60) Provisional application No. 62/538,859, filed on Jul. 31, 2017.

(51) Int. Cl.
| | | |
|---|---|---|
| *C08F 226/02* | (2006.01) | |
| *C08F 8/02* | (2006.01) | |
| *C08F 8/10* | (2006.01) | |
| *C08F 2/44* | (2006.01) | |
| *D21H 21/18* | (2006.01) | |
| *C08K 3/30* | (2006.01) | |
| *C08K 5/14* | (2006.01) | |
| *C08K 5/23* | (2006.01) | |
| *D21H 17/56* | (2006.01) | |
| *D21H 21/16* | (2006.01) | |
| *C08K 3/08* | (2006.01) | |
| *D21H 21/22* | (2006.01) | |
| *D21H 27/00* | (2006.01) | |
| *C08F 2/20* | (2006.01) | |
| *C08F 2/10* | (2006.01) | |

(52) U.S. Cl.
CPC ............. *C08F 226/02* (2013.01); *C08F 2/10* (2013.01); *C08F 2/20* (2013.01); *C08F 2/44* (2013.01); *C08F 8/02* (2013.01); *C08F 8/10* (2013.01); *C08K 3/08* (2013.01); *C08K 3/30* (2013.01); *C08K 5/14* (2013.01); *C08K 5/23* (2013.01); *D21H 17/56* (2013.01); *D21H 21/16* (2013.01); *D21H 21/18* (2013.01); *D21H 21/22* (2013.01); *D21H 27/002* (2013.01); *D21H 27/005* (2013.01); *C08F 2800/10* (2013.01); *C08K 2003/0818* (2013.01); *C08K 2003/3054* (2013.01)

(58) Field of Classification Search
CPC .. C08F 226/02; C08F 8/02; C08F 8/10; C08F 2/44; C08F 2/20; C08F 2/10; C08K 3/08; C08K 3/30; C08K 5/14; C08K 5/23; D21H 17/56; D21H 21/16; D21H 21/18; D21H 27/002; D21H 27/005
USPC .......................................................... 524/555
See application file for complete search history.

(56) References Cited

U.S. PATENT DOCUMENTS

| | | |
|---|---|---|
| 5,292,441 A | 3/1994 | Chen et al. |
| 5,753,759 A | 5/1998 | Hartmann et al. |
| 5,994,449 A | 11/1999 | Maslanka |
| 6,488,812 B2 | 12/2002 | Shannon et al. |
| 6,864,330 B2 | 3/2005 | Schneider et al. |
| 6,951,598 B2 | 10/2005 | Flugge et al. |
| 7,041,197 B2 | 5/2006 | Kokko et al. |
| 7,541,409 B2 * | 6/2009 | Grimm ................ C08G 81/025 162/164.1 |
| 7,902,312 B2 * | 3/2011 | Gu ............................ C08F 8/12 526/310 |
| 8,604,134 B2 | 12/2013 | Gu et al. |
| 8,614,279 B2 | 12/2013 | Gu et al. |
| 2003/0024669 A1 | 2/2003 | Kokko |
| 2010/0193148 A1 * | 8/2010 | McKay ..................... C08F 8/44 162/164.6 |
| 2015/0299961 A1 | 10/2015 | Borkar et al. |

OTHER PUBLICATIONS

ISA/US, International Search Report and Written Opinion, issued in IA Application No. PCT/US2018/041751, dated Nov. 15, 2018.

* cited by examiner

*Primary Examiner* — Michael Bernshteyn
(74) *Attorney, Agent, or Firm* — Lorenz & Kopf, LLP

(57) ABSTRACT

Disclosed herein are hydrophobic vinylamine-containing polymers useful as papermaking performance additives for enhancing paper softness with little or no negative effect on paper dry strength properties. The hydrophobic vinylamine-containing polymers are produced by incorporating hydrophobic functional property into primary amine moiety of the vinylamine-containing polymers via reactions with reactive hydrophobes. The hydrophobically modified vinylamine-containing polymers can be further used as base polymers for polymerization with a vinyl monomer by free radical initiated polymerization. The compositions of those hydrophobic vinylamine-containing polymers have shown improved softness, reduced coefficient friction to paper products while maintained or improved dry strength properties of the paper products.

15 Claims, 4 Drawing Sheets

US 10,618,992 B2

HYDROPHOBIC VINYLAMINE-CONTAINING POLYMER COMPOSITIONS AND THEIR USE IN PAPERMAKING APPLICATIONS

CROSS-REFERENCE TO RELATED APPLICATION

This application claims the benefit of U.S. provisional application No. 62/538,859, filed 31 Jul. 2017, the entire contents of which are hereby incorporated by reference.

BACKGROUND

The current composition relates to hydrophobic vinylamine-containing polymers as paper softeners and dry strength aids and the processes for preparing them. In the current composition the primary amine groups of vinylamine-containing polymers are substituted with reactive hydrophobic functional groups and optionally with other reactive functional groups that impart physical characteristics of the polymers and provides applications properties to papermaking to soften paper products with no or minimal impact on paper dry strength properties.

Tissue and towel products are conventionally used as absorbent paper materials and softness of these products is an important physical property from customers' perspective. The softness sensation perceived by the consumer's hand (handfeel) comes from several paper properties including flexibility or stiffness of the paper sheet and the smoothness of the paper surface. Other major and critical physical properties of the paper products are the paper sheet tensile strength and water absorbency. The challenge in papermaking of the tissue and towel products is to balance these properties in order to produce a paper product with improved softness but not hurting the paper tensile strength and the water absorbance.

Traditional paper debonding agents including various imidazoline and ester quaternary derivatives can be applied as dispersions to papermaking fibers to disrupt cellulosic fiber-to-fiber binding, resulted in softer paper products. However, some of these low molecular weight (less than about 5,000 Daltons) hydrophobic cationic debonders such as quaternary imidazoline might cause irritation on human skin due to the exiting of residual toxic chemicals in the products that are highly controlled under governmental regulation. Furthermore, these types of debonding agents, when used as softeners, often cause significant decreases in paper tensile strength, and to such an extent in many cases that a dry strength resin needs to be used to compensate the strength loss in the paper sheet. In turn, using a dry strength resin could result in negatively affect paper softness. The dry strength resin not only complicates the papermaking process, but is also economically unfavorable. Although a significant amount of research and development efforts have been directed to the improvement of paper softness without affecting tensile strength, there is no single and good technical solution that can benefit both softness and tensile strength of the tissue or towel products.

A polymeric cationic softener is preferred in chemical design because it can be readily applied at the wet end in a papermaking process and still have good retention ability on the anionic cellulosic fiber. Structurally, the composition with high molecular weight softeners should possess the characteristics of the hydrophobic section as well as a hydrophilic section. One possible approach to constitute this type of structure is to modify a high molecular weight and hydrophilic water soluble cationic polymer using a reactive hydrophobic compound. The hydrophobic moiety can be appended to the polymer backbone in a random fashion or capped at both chain ends of the polymer.

U.S. Pat. No. 6,488,812 discloses new synthetic hydrophobic polymers having hydrogen bonding capability for reducing lint and slough in soft tissue products while maintaining softness and strength. US Patent Application No. 2003/0024669 discloses the use of hydrophobically modified polyaminoamides with polyethylene glycol esters in paper products to produce a softer and more absorbent paper material. U.S. Pat. No. 7,041,197 discloses a hydrophobically modified anionic polyelectrolyte and a method for making paper to enhance its wet strength without affecting paper softness.

Vinylamine-containing polymers are conventionally used in papermaking to improve dry strength of the paper products and to improve retention and drainage in papermaking processes. The primary amine groups of a vinylamine-containing polymer can be readily modified covalently as desired to introduce additional functionality to the polymer and alter its chemical and physical properties making it useful in other industrial applications as well as papermaking.

U.S. Pat. No. 5,292,441 discloses quaternized polyvinylamines obtained from the reaction with a quaternizing agent, such as methyl chloride, dimethyl sulfate, or benzyl chloride as flocculants and their use for wastewater clarification. U.S. Pat. No. 8,604,134 discloses modification of polyvinylamine with different functional groups and its application as a paper making additive. U.S. Pat. No. 7,902,312 discloses Michael adduct of polyvinyl amine with α, β-unsaturated alkyl carbonyl compounds and its subsequent use as an additive for paper making system. U.S. Pat. No. 5,994,449 discloses the use of vinylamine-vinyl alcohol copolymer functionalized with epichlorohydrin and its mixture with polyaminoamide as creping adhesive for paper application. U.S. Pat. No. 8,614,279 discloses a process for producing an acylated vinylamine-containing polymer.

Vinylamine-containing polymers are also used as base polymer for grafted polymerization of vinyl monomers. U.S. Pat. No. 6,864,330 discloses a PEG grafted polyvinylamine derivative. U.S. Pat. No. 5,753,759 discloses graft copolymers of vinylamine based polymers. US Patent Application No. 2015/0299961 discloses a graft copolymer composition of a vinyl monomer and a functionalized vinylamine-containing base polymer and a method of preparing the graft copolymer.

Although some of the above references disclose modified vinylamine-containing polymers, they do not disclose the current hydrophobically modified polyvinylamines, which can be used as papermaking dry strength additives, retention aids, drainage aids or pitch and stickies control agents. Nor, do any of the references disclose hydrophobic polyvinylamine derivatives in papermaking. Through extensive research it was found that hydrophobically modified vinylamine-containing polymers can enhance paper softness without negatively impacting paper dry strength properties.

SUMMARY

Figure 1:
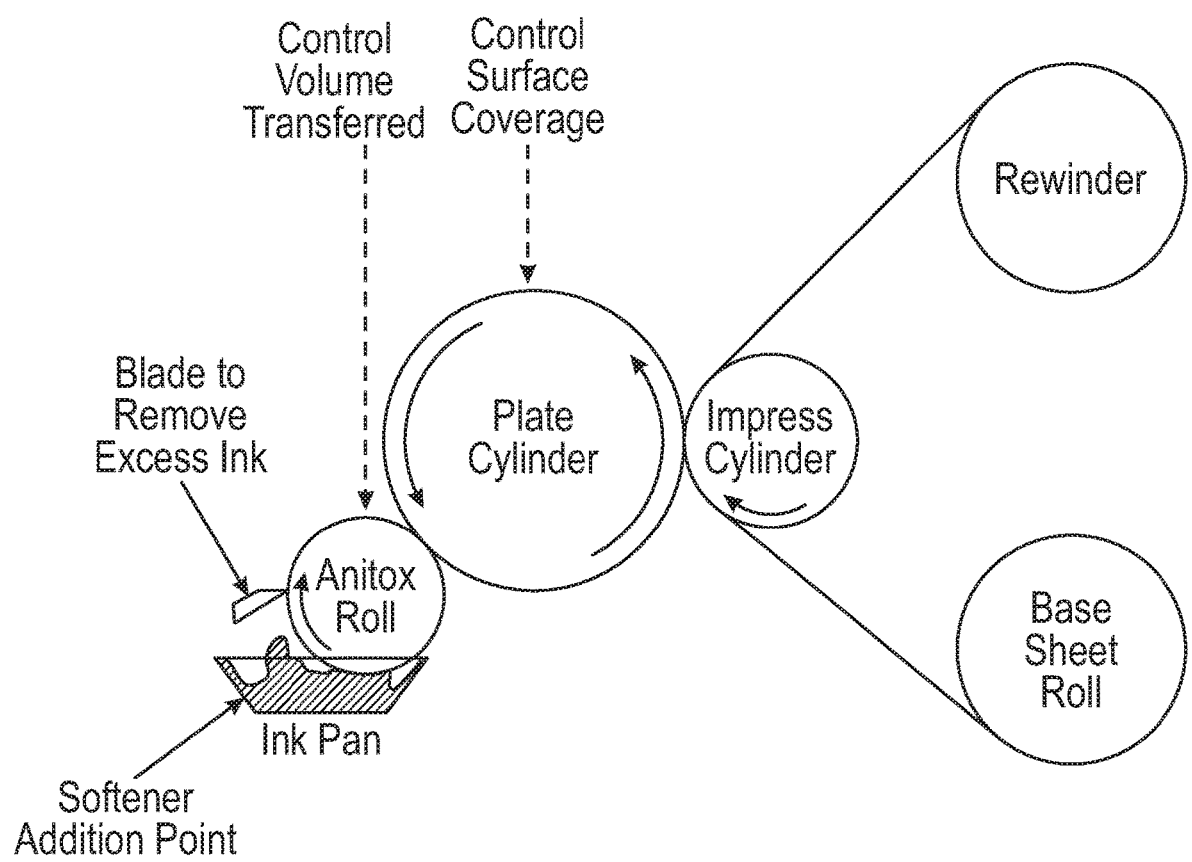
FIG. 1, depicts surface addition of the hydrophobic vinylamine compositions of the present invention in performance evaluation.

Provided are compositions of hydrophobic vinylamine-containing polymers. Also, provided are processes of making the hydrophobic vinylamine-containing polymers. The hydrophobic vinylamine-containing polymers are aqueous dispersible hydrophobic cationic polymers that can be used as a papermaking additive to enhance paper softness with little or no negative effect on paper dry strength properties.

The current hydrophobic vinylamine-containing polymers may also be used as detackifiers for stickies control or used as a coagulant to increase the retention of fines and fillers via fixative mechanism in the papermaking process. The current hydrophobic vinylamine-containing polymers may also be used as a flocculant in waste water treatment, a plasticizer, a viscosity modifier, a personal care additive, a coating material, or a slow releasing carrier for various industrial applications.

The present invention also relates to a process for preparing the hydrophobic vinylamine-containing polymers, comprising the step of reacting a vinylamine-containing polymer in water with active solids between about 1% to about 50%, can be between about 5% to about 25%, and may be from about 10% to about 20%. In the context of the present invention the phrase "active solids" means the weight % of polyvinylamine in the composition. The pH of the reaction is from about 6 to about 12, pH can be from about 7 to about 11, and the pH may be from about 8 to about 10, at a reaction temperature from about 5° C. to about 80° C., can be from about 30° C. to about 70° C., and may be from about 35° C. to about 60° C., for a period of from about 6 minutes to about 8 hours, can be from about 30 minutes to about 5 hours, and may be from about 1 hour to about 3 hours, with a hydrophobically modified compound selected from the group consisting of a $C_4$ or longer carbon chain hydrophobic alkylating and acylating reactive agent. The term hydrophobe will be used herein throughout the application to describe the polyvinylamine having hydrophobic properties. The vinylamine-containing polymer can be optionally reacted before or after the hydrophobic reaction with a compound selected from the group consisting of a short chain ($C_2$-$C_4$) alkylating or acylating agent. The primary amine groups of the vinylamine repeating units in the vinylamine-containing polymers are believed to be the active functionalities for paper wet strength. Alkylation or acylation of vinylamine-containing polymer can result in a decrease in primary amine content, which would affect its dry strength performance on paper products, such as bath tissue, and also lower wet tensile properties, which is not desirable.

In other aspects, the present invention relates to a process for preparing a hydrophobic vinylamine-containing polymers, comprising the steps of (1) reacting a vinylamine-containing polymer in water wherein the vinylamine-containing polymer has an active solids from about 1% to about 50%, can be from about 5% to about 25%, and may be from about 10% to about 20%, at pH of from about 6 to about 12, the pH can be from about 7 to about 11, and the pH may be from about 8 to about 10, at a reaction temperature of from about 5° C. to about 80° C., can be from about 30° C. to about 70° C., and may be from about 35° C. to about 60° C., for a period of time from about 6 minutes to about 8 hours, can be from about 30 minutes to about 5 hours, and may be from about 1 hour to about 3 hours, with a hydrophobe compound such as, a $C_4$ or longer carbon chain hydrophobic alkylating, or acylating reactive agent. The vinylamine-containing polymer can be optionally reacted before or after the hydrophobic reaction with a compound such as, a short chain ($C_2$-$C_4$) alkylating or acylating agent; (2) diluting the material at active solids to about 0.1% to about 20% active solids, can be from about 1% to about 15% active solids, and may be from about 3% to about 8% active solids; (3) adjusting the pH to from about 1 to about 4, the pH can be from about 2 to about 3.8, and the pH may be from about 3 to about 3.6; and (4) conducting free radical initiated polymerization at a temperature of from about 30° C. to about 100° C., from about 40° C. to about 80° C., and most preferably from about 55° C. to about 75° C., for from about 10 minutes to about 300 minutes, and can be from about 30 minutes to about 150 minutes, and may be from about 40 minutes to about 80 minutes.

The hydrophobic vinylamine-containing polymers of the present invention enhance paper softness and reduce the coefficient of friction of tissue and towel and paper while maintaining or providing improved paper dry tensile strength when compared with an untreated blank and or tissue or towel treated with a standard polyethylene glycol or imidazoline based paper softener.

It was found that the present hydrophobic vinylamine-containing polymers or vinyl polymers enhanced paper softness and reduce the coefficient of friction while providing improved paper dry tensile strength when compared with an untreated blank, when they were added at the wet end of the papermaking process and when the surface of already formed tissue was treated prior to creping. Alternatively, the current hydrophobic vinylamine-containing polymers or vinyl polymers can be added to the surface of the already creped tissue. The current hydrophobic vinylamine-containing polymers or vinyl polymers can be added at treatment levels of from about 0.01 active wt. % to about 0.5 active wt. % based on the weight of the dry pulp and can be added at treatment levels from about 0.05 active wt. % to about 0.3 wt. % based on the weight of the dry pulp. The paper products made with the current composition has similar water dispersing ability and water drop sizing compared with standard imidazoline paper softeners and had lower permanent wet strength than the paper products made with glyoxalated polyacrylamide.

The current hydrophobic vinylamine-containing polymers can be used in combination with other compositions or additives in the paper making process in order to improve the physical and application properties of the hydrophobic vinylamine-containing polymers or vinyl polymers. The additional compositions or additives can be any that are used in the papermaking industry including, sizing agents, retention and drainage aids, surfactants, debonders, softeners, humectants, lotions, wet-strength resins, drainage aids, contaminant and pitch control agents, and defoamers. Additives can be added anywhere in the papermaking process, such as the wet-end of the paper machine, or to the already formed paper product. The compositions or additives can be hydrophobic, cationic, anionic, amphoteric, nonionic synthetic, or natural polymers. For example, the current hydrophobic vinylamine-containing polymers can be emulsified with polyethylene glycol long chain alkyl ethers to form stable emulsions having a smaller particle size thus improving the softness and dispersing properties of paper products. The additional additives can be blended together with the current hydrophobic polymers to form a blended composition prior to use, or they may be applied sequentially before or after the application of the current hydrophobic polymers.

DETAILED DESCRIPTION

One embodiment, there is provided a hydrophobic vinylamine-containing polymers comprising randomly distributed repeating monomer units having the formula (I):

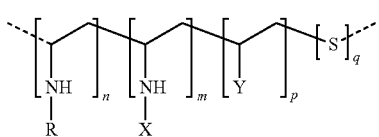
(I)

wherein R is a hydrogen or an acyl group, and can be an acetyl, propionyl, or butyryl group, or a reacted α, β-unsaturated alkyl carbonyl compound through Michael addition by vinylamine in the polymer; Y is any functionality, and can be a hydroxyl, carboxylic acid or acid amides; S is repeating unit from polymerized diallyldimethylammonium chloride; X is selected from the group consisting of formula (II), (III), (IV), (V), (VI), (VII), (VIII) and (IX):

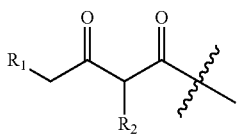
(II)

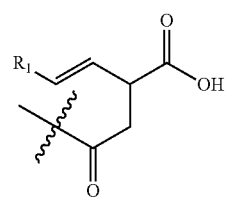
(III)

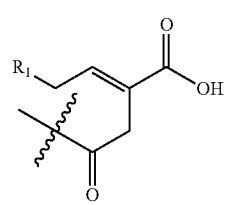
(IV)

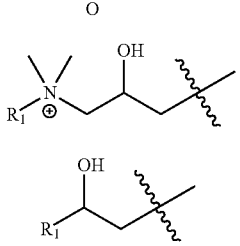
(V)

(VI)

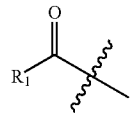
(VII)

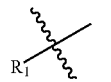
(VIII)

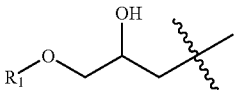
(IX)

wherein $R_1$ and $R_2$, identically or differently, are a straight chain, a branched aliphatic chain, an olefinic group or an aromatic group having up to 22 carbon atoms and up to 4 double bonds. The dashed lines represent the bonds connecting the repeating units of Formula (I) with the group consisting of Formula (II), (III), (IV), (V), (VI), (VII), (VIII) and (IX), wherein n can be from 0 mole % to about 99 mole %, m can be from about 0.1 mole % to about 90 mole %, p can be from 0 mole % to about 98 mole %, and q can be from 0 mole % to about 50 mole %.

In another embodiment, the composition as described above is a hydrophobic vinylamine-containing vinyl polymer of a vinyl monomer and a base polymer having the Formula (I), wherein the vinyl monomer can be acrylamide, acrylic acid, methacrylamide, methyl methacrylate, acrylonitrile, methyl acrylate, alkyl methacrylate, N-(2-methylpropanesulfonic acid)acrylamide, N-[3-(propyl)trimethylammonium chloride]acrylamide, and combinations thereof; and the mole ratio of the base polymer of Formula (I) to the vinyl monomer is from about 5:95 to about 50:50.

In other embodiments, the current hydrophobic vinylamine-containing vinyl polymer comprises the base polymer Formula (I), wherein n is from 0 mole % to 60 mole %, m is from about 1 mole % to about 90 mole % and q is 0 mole %; wherein the vinyl monomer is acrylamide; and wherein the mole ratio of the base polymer to acrylamide is from about 5:90 to about 50:50, and can be from about 10:90 to about 30:70.

In other embodiments of the current composition, the α, β-unsaturated alkyl carbonyl compounds of the hydrophobic polymer include, for example, acrylamide, methacrylamide, t-butyl acrylamide, N-alkylacrylamide, N-alkylmethacrylamide, N-[3-(propyl)trimethylammonium chloride]acrylamide, N-[3-(propyl)trimethylammonium chloride]methacrylamide, methyl acrylate, alkyl acrylate, methyl methacrylate, alkyl methacrylate, aryl acrylate, aryl methacrylates, [2-(methacryloyloxy)ethyl]-trimethylammonium chloride, N-[3-(dimethylamino)propyl] acrylamide, N-[3-(dimethylamino)propyl] methacrylamide, N-ethylacrylamide, 2-hydroxyethyl acrylate, acrylonitrile, vinylpyridine, 1-vinyl-2-pyrrolidinone, acrylamidopropyltrimethylammonium chloride and combinations thereof.

In one embodiment, provided is a process for preparing the current hydrophobic vinylamine-containing polymers having Formula (I), wherein a vinylamine-containing polymer in water is reacted with a compound selected from the group consisting of a $C_4$ or longer carbon chain hydrophobic alkylating, or acylating reactive agent alkylating agent having an active solids of from about 1% to 50%, can be from about 5% to about 25%, and may be from about 10% to about 20%, at pH of from about 6 to about 12, the pH can be from about 7 to about 11, and the pH may be from about 8 to about 10, at a reaction temperature of from about 5° C. to about 80° C., can be from about 30° C. to about 70° C., and may be about 35° C. to about 60° C., for a period of time from about 6 minutes to about 8 hours, can be from about 30 minutes to about 5 hours, and may be from about 1 hour to about 3 hours.

In one embodiment of the above process, wherein said acylating agent is selected from the group consisting of alkyl ketene dimers having 8 to 44 carbon atoms, or alkenyl ketene dimers having 8 to 44 carbon atoms, or alkenyl succinyl anhydrides having 8 to 44 carbon atoms, or combinations thereof.

The $C_4$ or longer carbon chain hydrophobic alkylating agents that may be used in the above process include, but are not limited to, alkyl glycidyl ethers having 4 to 44 carbon atoms, alkylene oxides having 4 to 44 carbon atoms, alkyl halides having 4 to 44 carbon atoms, 3-chloro-2-hydroxypropyl-alkyl-dimethylammonium chlorides having 4 to 44 carbon atoms, and (dialkylamino)alkyl chlorides having 4 to 44 carbon atoms. Alkyl glycidyl ethers that may be used in the above process include, but are not limited to, butyl glycidyl ether, octyl glycidyl ether, 2-ethylhexyl glycidyl ether, decyl glycidyl ether, dodecyl glycidyl ether, tetradecyl glycidyl ether, hexadecyl glycidyl ether, and octadecyl glycidyl ether. Alkylene oxides that may be used in the above process include, but are not limited to, propylene oxide, dibutyl-ethylene oxide, butylene oxide, octylene oxide, butadiene monoxide, cyclohexane epoxide, and hexyl-ethylene oxide. Alkyl halides that may be used in the above process include, but are not limited to, ethyl chloride, propyl chloride, butyl chloride, octyl chloride, dodecyl chloride, hexadecyl chloride, benzyl chloride, phenylethyl chloride. 3-chloro-2-hydroxypropyl-alkyl-dimethylammonium chlorides that may be used in the above process include, but are not limited to, 3-chloro-2-hydroxypropyl-lauryl-dimethylammonium chloride, 3-chloro-2-hydroxypropyl-cocoalkyl-dimethylammonium chloride, and 3-chloro-2-hydroxypropyl-stearyl-dimethylammonium chloride. (Dialkylamino)alkyl chlorides that may be used in the above process include, but are not limited to, (4-chloroobutyl)trimethylammonium chloride, (6-chlorohexyl)-trimethylammonium chloride and (8-chlorooctyl)trimethylammonium chloride.

Another embodiment of the present invention is the above process, wherein said alkylating agent is selected from the group consisting of alkyl glycidyl ethers having 8 to 44 carbon atoms, alkylene oxides having 8 to 44 carbon atoms, alkyl halides having 8 to 44 carbon atoms, 3-chloro-2-hydroxypropyl-alkyl-dimethylammonium chlorides having 8 to 44 carbon atoms, and (dialkylamino)alkyl chlorides having 8 to 44 carbon atoms.

Mole percentage of $C_4$ or longer carbon chain hydrophobic alkylating or acylating agents in the hydrophobic polymers of the present invention affects the application performance as paper softener and needs to be controlled within a suitable range to provide desired properties to paper products. Mole percentage of $C_4$ or longer carbon chain hydrophobic alkylating or acylating agents in the hydrophobic polymers is from about 0.05% to about 50%, preferably from about 0.2% to about 25%, and most preferably from about 0.5% to about 10%.

In other embodiments of the present invention, the vinylamine-containing polymers used in the current process include, but is not limited to, partially or completely hydrolyzed poly(N-vinylformamide), copolymers of N-vinylformamide and vinylamine, copolymers of vinylamine and amidine, copolymers of N-vinylacetamide and vinylamine, terpolymers of N-vinylformamide, vinylamine and amidine, terpolymers of N-vinylformamide, vinylamine and vinylamine methyl chloride quaternary ammonium salts, terpolymers of N-vinylformamide, copolymer of vinylamine and vinyl alcohol, terpolymers of N-vinylformamide, vinylamine and vinyl acetate, terpolymers of N-vinylformamide, vinylamine and acrylamide, terpolymers of N-vinylformamide, vinylamine and acrylate, terpolymers of N-vinylformamide, vinylamine, and diallyldimethyl ammonium chloride, terpolymers of N-vinylformamide, vinylamine, and vinyl trimethoxysilane, copolymers of N-vinylamine and vinyl alcohol, copolymers of N-vinylamine and diallyldimethylammonium chloride, copolymers of N-vinylamine and acrylic acid, vinylamine homo- and copolymers manufactured by the Hofmann modification of acrylamide polymers or vinylamine-containing polymers, and combinations thereof.

In addition to primary amine of vinylamine, partially hydrolyzed polyvinylformamide and vinylamine copolymers typically comprise randomly distributed amidine functional groups. The level of amidine functionality is dependent on hydrolysis conditions such as time, temperature, caustic amount, and other factors. Persons of ordinary skill in the art will understand that the alkylation and acylation of primary amine functionality to give the randomly distributed repeating monomer units of formula (I) can also occur on the nitrogen atoms of the amidine functional groups.

In yet other embodiments of the present invention, the vinylamine-containing polymers used in the current process is partially or completely hydrolyzed poly(N-vinylformamide) and copolymer of vinylamine and vinyl alcohol.

The vinylamine-containing polymer of the current process can be optionally reacted before or after the hydrophobic reaction with a compound selected from the group consisting of a short chain ($C_2$-$C_4$) alkylating or acylating agent, or mixtures thereof. The primary amine groups of the vinylamine repeating units in the vinylamine-containing polymers are believed to be the active functionalities for paper wet strength. Alkylation or acylation of vinylamine-containing polymer can result in a decrease in primary amine content, which would affect its strength performance on paper products, such as bath tissue, and lower wet tensile properties are desirable.

In some embodiments, a surfactant can be used in making the hydrophobic cationic vinylamine-containing polymers. The surfactants can help disperse the reactive hydrophobe in the reaction mixture and allow the alkylation or acylation reactions to proceed evenly on the backbone of the vinylamine-containing polymers. The surfactants can also help stabilize the hydrophobe products as emulsions, reduce particle size and improve the performances of the hydrophobe products. The surfactants includes, but is not limited to, low molecular weight polyethylene glycol (less than 5,000 Daltons) long chain alkyl ethers such as polyethylene glycol (400 MW) mono-oleate, alkanolamides, alkoxylated alcohols, amine oxides, ethoxylated amines, alkoxylated amides, EO-PO-block copolymers, alkyl glycidyl ether ends-capped polyethylene glycol, alkoxylated fatty alcohols, alkoxylated fatty acid esters, alkylarylalkoxylates, sorbitan derivatives, polyglyceryl fatty acid esters, alkyl(poly)glucosides, fluorocarbon-based surfactants, or combinations thereof. Those surfactants typically have an HLB range between 3 and 18 with a preferred range between 4 and 14. Softeners and debonders such as bis-amide softeners, imidazoline debonders, and quaternary esters, and many other tissue softeners as described in U.S. Pat. No. 6,458,343 can also be used to help disperse the hydrophobic cationic vinylamine-containing polymers. The weight percent of the surfactant based on the vinylamine-containing polymer can be in the range of from about 10% to about 1000%, preferably from about 50% to about 500%, and most preferably from about 100% to about 300%.

In one embodiment, the molecular weight (Mw) of the hydrophobic vinylamine-containing polymers can range from about 2,000 Daltons to about 1,000,000 Daltons, can be from about 4,000 Daltons to about 800,000 Daltons, and may be from about 10,000 Daltons to about 500,000 Daltons.

In yet another embodiment, a process for preparing a hydrophobic vinylamine-containing vinyl polymer is provided. The process includes (1) dissolving a hydrophobic vinylamine-containing polymers (Formula I) in a media, such as water, an ionized solution, a solvent, or combinations thereof, at an active solids of from about 0.1% to about 20%, can be from about 1% to about 15% active solids, may be from about 3% to about 8% active solids, (2) adjusting the pH to from about 1 to about 4, can be a pH of from about 2 to about 3.8, and may be a pH of from about 3 to about 3.6, and (3) conducting free radical initiated polymerization at a temperature of from about 30° C. to about 100° C., can be from about 40° C. to about 80° C., and may be from about 55° C. to about 75° C. The reaction is continued for from about 10 minutes to about 5 hours, can be continued for from about 30 minutes to about 2.5 hours, and may be continued for from about 40 minutes to about 80 minutes.

In another embodiment of the above preparation process, an optional initiator can be added to the polymerization reaction. The initiator can be selected from the group consisting of hydrogen peroxide, tert-butylhydroperoxide (TBHP), sodium, potassium or ammonium persulfates, azo initiators, and redox initiator systems. The initiator can be hydrogen peroxide added to the aqueous medium. In this case the polymerization can be carried out at a pH of from about 3.0 to about 3.8; and at a temperature of from about 40° C. to about 80° C. for from about 40 minutes to about 80 minutes.

The vinyl monomer used in the polymerization reaction can be acrylamide, acrylic acid, methacrylamide, methyl methacrylate, acrylonitrile, methyl acrylate, alkyl methacrylate, N-(2-methylpropanesulfonic acid)acrylamide, N-(glycolic acid)acrylamide, N-[3-(propyl)trimethylammonium chloride]acrylamide, and combinations thereof; and may be acrylamide, methacrylamide, methyl methacrylate and combinations thereof. In addition, the molecular weight (Mw) of the hydrophobic vinylamine-containing vinyl copolymer can be in the range of from about 4,000 Daltons to about 2,000,000 Daltons, preferably from about 6,000 Daltons to about 1,000,000 Daltons, and most preferably from about 100,000 Daltons to about 700,000 Daltons.

The hydrophobic vinylamine-containing polymers can be soluble in water, or emulsions/dispersions in water, depending on how much hydrophobe is attached on the polymer. When too much hydrophobe is attached to the vinylamine-containing polymers, the hydrophobic polymers can become water insoluble or non-dispersible in water. The physical properties of the hydrophobic polymers depend on the weight percentage of the hydrophobe appended on the polymers. For example, the hydrophobe level of the hydrophobic vinylamine-containing polymers can be in the range of from about 0.2% to about 80%, can be from about 1% to about 50%, and may be from about 2% to about 30%.

Without wishing to be bound by theory, the hydrophobic vinylamine-containing polymers or hydrophobic vinylamine-containing vinyl polymers of the present compositions may undergo chemical self-crosslinking under various conditions, resulting in a change in physical and chemical properties to form a gel or a high viscosity, high molecular weight polymer. Typical examples are the transamidation of vinylamine with polyacrylamide of the hydrophobic vinylamine-containing vinyl polymer and formation of polyelectrolyte of the amines with anionic moieties derived from amides.

The current hydrophobic vinylamine-containing polymers or hydrophobic vinylamine-containing vinyl polymers can be used in papermaking as a bulkiness enhancer to improve paper bulkiness while maintaining sheet strength. The current hydrophobic polymers may also be used as detackifiers for stickies control via dispersing mechanism and used as coagulants to increase the retention of fines and fillers via a fixative mechanism in the papermaking process. The current hydrophobic polymers may also be used as flocculants in waste water treatment, as a plasticizer, a viscosity modifier, a personal care additive, a coating material for various uses such electronic, personal care or pharmaceutical industries, or as a slow releasing carrier for various industrial applications.

The current hydrophobic vinylamine-containing polymers was found to enhance paper softness and reduce the coefficient of friction of tissue and towel and paper while maintaining or providing improved paper dry tensile strength when compared with an untreated blank and or tissue or towel treated with a standard polyethylene glycol or imidazoline based paper softener.

The current hydrophobic vinylamine-containing polymers or vinyl polymers were found to be effective whether the hydrophobic polymers were added at the wet end of the papermaking process or to the surface of already formed tissue paper, prior to creping. Alternatively, the current hydrophobic vinylamine-containing polymers or vinyl hydrophobic vinylamine-containing polymers can be added to the surface of the already creped tissue. The current hydrophobic vinylamine-containing polymers or vinyl polymers can be added to the papermaking process at treatment levels of from about 0.01 active wt. % to about 0.5 active wt. % based on the weight of the dry pulp and can be added at treatment levels from about 0.05 wt. % to about 0.3 wt. % based on the weight of the dry pulp. The paper products made with the present composition has similar water dispersing ability and water drop sizing compared with standard imidazoline paper softeners and lower permanent wet strength than those made with glyoxalated polyacrylamide.

The current hydrophobic vinylamine-containing polymers or hydrophobic vinylamine-containing vinyl polymers can also be used in papermaking as a bulkiness enhancer to improve paper bulkiness while maintaining sheet strength. Conventional approaches to improve paper bulkiness, particularly for printing and writing grade, include reducing refining to improve stiffness, reducing wet press to reduce fiber binding, balancing calendering and sheet surface properties, reducing calendering or no post-calendering or using high bulk coating to reduce coat weight. The current hydrophobic vinylamine-containing polymers, added at the wet end in papermaking, demonstrates potential benefits of improving paper bulkiness and maintaining tensile and ZDT strength properties with calendering loading pressure.

In yet another embodiment, the current hydrophobic vinylamine-containing polymers and copolymers can be used in combination with other additives in order to improve the physical and application properties of the hydrophobic vinylamine-containing polymers or vinyl polymers. The additional additives can be hydrophobic, cationic, anionic, amphoteric, nonionic synthetic, or a natural polymer.

For example, the current hydrophobic vinylamine-containing polymers can be emulsified with a surfactant such as a low molecular weight polyethylene glycol (less than about 5000 Daltons) long chain alkyl ethers such as PEGMO to form stable emulsions with lower particle size thus improving the softness and dispersing properties of paper products. The hydrophobically modified polyvinylamines can also be blended with commercial softeners or debonders including bis-amide softeners, imidazoline debonders, or quaternary esters, including the softeners and debonders commercially available from Solenis Inc. (Wilmington, Del.), Evonik Inc. (Essen, Germany), Nalco Inc. (Naperville, Ill.), or as described in U.S. Pat. No. 6,458,343. The additional additives can be blended together with the hydrophobic vinylamine polymers of the present invention to form a blended composition prior to use, or they may be applied sequentially before or after the application of the current hydrophobic vinylamine polymers. Particularly preferred are surfactants that yield a stable formulation without adversely affecting the performance of the hydrophobically modified vinylamine-containing polymers of the present invention.

In some embodiments, the hydrophobic vinylamine-containing polymers described above can be added to the papermaking system at any stage, but preferably at the wet end. The current hydrophobic vinylamine compositions may also be applied to paper via surface treatment in the papermaking process. The current hydrophobic vinylamine compositions can also be added to the papermaking system as a dispersion in an aqueous salt solution, a solution or dispersion in conjunction with a surfactant, or another solution, although water is the primary solvent. Examples of carrier solvents include, but are not limited to, water-soluble solvents such as ethylene glycol and propylene glycol.

The effective amount of the hydrophobic vinylamine-containing polymers added to the papermaking system depends on a number of variables, including but not limited to the chemical additives in the creping stage in papermaking and other additives used in white water chemistry and process conditions. Generally, the amount of hydrophobic vinylamine-containing polymers used in a papermaking process can range from about 0.01% active solids to about 5% active solids on weight basis of dry pulp and can be from about 0.05% active solids to about 1% active solids and may be from about 0.1% active solids to about 0.3% active solids based on weight of dry pulp.

Advantages associated with the current method of making paper compared with prior papermaking processes include an ability to provide paper softness with no effect or limited effect on paper tensile and stretch strength and an ability to control contaminants versus a dispersing mechanism. The hydrophobic vinylamine-containing polymers of the current process can also be designed to have improved water dispersing stability without sacrificing performance in papermaking applications of the present invention.

Size exclusion chromatographic (SEC) analysis was performed using a Shodex KW-804 Protein column with the column temperature set at 40° C. The mobile phase contained 70% methanol and 30% water with lithium salt set at a pH of 4.8. A sample of the hydrophobically modified polyvinylamine product of the present invention was dissolved at a concentration of 1.5 mg/mL in the mobile phase and injected into the machine. The flow rate was set at 1.0 mL per minute. Poly(ethylene glycol) (PEGMO) samples of different molecular weights were used as standards.

The term "active solids" used for the polymer of the present composition herein represents the total weight of the polymer as a percentage of a solution of all the monomers and modifying compounds used for making the polymer on dry weight basis. The term "mole percent" of a monomer in a polymer refers to percentage of specific monomer present in the polymer as a repeating unit. The term "weight percent" or "weight ratio" of a material used in the present invention represents the percentage or the ratio of the "active solids" of this material versus other components.

As used herein, the term "paper" refers to paper products including tissue paper, paper towels and paper board.

Brookfield viscosity (BV) was measured on a DV-II Viscometer (Brookfield Viscosity Lab, Middleboro, Mass.) using a number 2 spindle at a speed of 30 RPM. The reaction solution was prepared at the specific active polymer content as seen in Tables I, II and III. The Brookfield viscosity spindle was carefully inserted into the solution so as not to trap any air bubbles and then rotated at the above-mentioned speed for 3 minutes at 24° C. The units are given in centipoise (cps).

The embodiments of the invention are defined in the following Examples. It should be understood that these Examples are given by way of illustration only. Thus various modifications of the present invention in addition to those shown and described herein will be apparent to those skilled in the art from the foregoing description. Although the invention has been described with reference to particular means, materials and embodiments, it is to be understood that the invention is not limited to the particulars disclosed, and extends to all equivalents within the scope of the appended claims.

EXAMPLES

The following examples demonstrate the hydrophobic vinylamine-containing polymers and vinyl copolymers of the current composition provided enhanced paper softness and smoothness with no or limited effect on paper dry strength, wet strength, and dispersing properties when the compositions are used as wet end additives during the paper making process. These examples and the data presented below better illustrate the benefits of the current composition and are not meant to be limiting.

Example 1

Hydrophobic Vinylamine-Containing Polymers Prepared from Polyvinylamine Homo Polymer and Alkenyl Ketene Dimer (Precis® 900 Hydrophobically Modified Polyvinylamine)

A stirred solution of polyvinylamine (250 g) was heated to 50° C. to 70° C. in a 500-mL flask was adjusted to pH 9 to 11 by treatment with 50% aqueous sodium hydroxide. An alkenyl ketene dimer (Precis® 900, Solenis, and Wilmington, Del., USA) was added dropwise over a period of 30 minutes to 90 minutes with stirring. The resulting mixtures were stirred at 50° C. to 70° C. for 2 to 4 hours, diluted with water (20 g), cooled to room temperature and adjusted to pH 8 with concentrated hydrochloric acid to give a white and homogenous solution.

Examples from 1-1 to 1-12 were prepared as described in Example 1 above using different weight ratios of Precis® 900 to polyvinylamine.

Alternatively, in Examples from 1-13 to 1-21, acetic anhydride was used to react with polyvinylamine to change the cationic charge density of the polymer and the reaction was conducted before or after the reaction with Precis® 900. In these examples, acetic anhydride was added dropwise to polyvinylamine solution over a 10 minute to 20 minute time period with stirring. The pH was maintained at a pH 8 to 9 using 50% aqueous sodium hydroxide. After the addition of the sodium hydroxide solution, the reaction mixtures were stirred at 50° C. to 70° C. for 1 hour, and then the pH was adjusted to 9 to 11 by treatment with 50% aqueous sodium hydroxide. The mixtures were then heated to 50° C. to 70° C. and reacted with alkenyl ketene dimer. Examples from 1-13 to 1-21 were prepared as described above using different weight ratios of Precis® 900 to polyvinylamine and different levels of acetic anhydride.

A non-ionic surfactant PEGMO (e.g., Polyethylene glycol (400 MW) mono-oleate, available from Manufacturers Chemicals, Cleveland, Tenn.,) was added as a dispersing agent and/or a stabilizer in the procedure the same as that shown in Example 1 to make the hydrophobic products of the present invention. Typically, PEGMO was mixed with Precis® 900 and the resulting mixture was added dropwise to polyvinylamine solution at 50° C. to 70° C. over a 10 to 20 minute time span at pH 9 to 11, which was maintained by adding an appropriate amount of 50% aqueous sodium hydroxide. After the addition of the sodium hydroxide, the mixtures were stirred at 70° C. for 2-4 hours. The mixtures were diluted with water as needed, cooled to room temperature and the pH was adjusted with concentrated hydrochloric acid to a pH 6-8 resulting in a white and homogenous solution. Example 1-3-1, 1-6-1, 1-5-1, 1-3-2 and Example 1-6-2 were prepared as described above using different weight ratios of Precis® 900 to polyvinylamine in the presence of different level of PEGMO.

TABLE I

Precis ® 900 Hydrophobically Modified Polyvinylamine

| Examples | Precis ® 900/ Hercobond ® 6363, w/w ratio | Acetic Anhydride (AA) or PEGMO to Hercobond ® 6363, w/w ratio | % free amine | Polymer active % | Viscosity (cps) |
|---|---|---|---|---|---|
| 1-1 | 0.25 | none | 97 | 11.4 | |
| 1-2 | 0.5 | none | 93 | 14.6 | |
| 1-3 | 1 | none | 87 | 17.2 | |
| 1-4 | 1.25 | none | 83 | 15.9 | |
| 1-5 | 1.5 | none | 80 | 17.1 | |
| 1-6 | 2 | none | 74 | 20.0 | |
| 1-7 | 3 | none | 60 | 20.0 | 206 |
| 1-8 | 4 | none | 46 | 20.0 | 126 |
| 1-9 | 5 | none | 33 | 15.0 | 86 |
| 1-10 | 6 | none | 20 | 15.0 | 50 |
| 1-11 | 7 | none | 6 | 15.0 | 40 |
| 1-12 | 7.5 | none | 0 | 15.0 | 36 |
| 1-13 | 0.1 | 1.3 (AA) | 8 | 10.6 | |
| 1-14 | 0.25 | 0.67 (AA) | 50 | 15.7 | 884 |
| 1-15 | 0.5 | 0.62 (AA) | 50 | 17.8 | 1800 |
| 1-16 | 1 | 0.53 (AA) | 50 | 20.7 | 1708 |
| 1-17 | 1.25 | 0.9 (AA) | 20 | 14.5 | 167 |
| 1-18 | 1.5 | 0.85 (AA) | 21 | 15.3 | |
| 1-19 | 2 | 0.33 (AA) | 50 | 25.5 | |
| 1-20 | 3 | 0.15 (AA) | 50 | 29.8 | |
| 1-21 | 4 | 0.38 (AA) | 20 | 20.0 | |
| 1-22 | 5 | 0.18 (AA) | 20 | 20.0 | |
| 1-3-1 | 1 | 1 (PEGMO) | 87 | 16.0 | 25000 |
| 1-6-1 | 2 | 1 (PEGMO) | 74 | 22.3 | 1020 |
| 1-7-1 | 3 | 3 (PEGMO) | 60 | 18.8 | 7068 |
| 1-3-2 | 1 | 2 (PEGMO) | 87 | 14.9 | 3029 |
| 1-6-2 | 2 | 2 (PEGMO) | 74 | 20.7 | 1550 |

Examples from 1-23 to 1-31 were prepared as described in Example 1, using different weight ratios of alkyl glycidyl ether to polyvinylamine or acetylated polyvinylamine.

TABLE II

Alkyl Glycidyl Ether Hydrophobically Modified Polyvinylamine

| Example | Alkyl glycidyl ether (alkyl chain length) | Precis ® 900/ Hercobond ® 6363, w/w ratio on active | Acetic Anhydride vs. PVAm w/w ratio on active | Polymer Active % |
|---|---|---|---|---|
| 1-23 | Hage ® 16 ($C_{16}$) | 0.5 | | 13.2 |
| 1-24 | Hage ® 16 ($C_{16}$) | 1 | 0.5 | 18.1 |
| 1-25 | Hage ® 16 ($C_{16}$) | 1 | | 18.1 |
| 1-26 | 2-EHGE ® ($C_8$) | 1 | | |
| 1-27 | Epodil ® 748 ($C_{12}$) | 2 | | 24.7 |
| 1-28 | Hage ® 16 ($C_{16}$) | 2 | | 20 |
| 1-29 | Hage ® 16 ($C_{16}$) | 2 | 0.18 | 24.5 |
| 1-30 | Hage ® 16 ($C_{16}$) | 3 | | 23.9 |
| 1-31 | Hage ® 16 ($C_{16}$) | 5 | | 20.5 |

Hage ® 16 and 2-EHGE ® are the alkyl glycidyl ethers from SaChem Inc. Epodil ® 748 ($C_{12}$) is from Air Products Inc.

Example 2

Hydrophobic Poly(Vinylamine-Co-Vinyl Alcohol) Prepared by Reacting (Vinylamine-Co-Vinyl Alcohol) with Alkenyl Succinic Anhydride or Alkenyl Ketene Dimer A solution of poly(vinylamine-co-vinyl alcohol) (25 grams active 20/80 vinylamine/vinyl alcohol, Selvol® CW 5150 from SEKISUI) was added to 390 grams water at 65° C. in a 500-mL flask and stirred for 2 hours. The pH of the resulting mixture was adjusted to 10 with 50% aqueous sodium hydroxide. To this solution was added alkenyl succinic anhydride (Prequel® 2000C, Solenis, LLC, Wilmington, Del., USA) dropwise over a 20 minute time period with constant stirring while maintaining a pH 9.8 by adding a 50% aqueous solution of sodium hydroxide to the mixture. The resulting mixture was stirred at 65° C. for 2.5 hours, diluted with water (200 g), cooled to room temperature and adjusted to pH 8.5 with concentrated hydrochloric acid to give a semitransparent or transparent solution with a total solids content of from about 6% to about 10%.

Examples 2-1 through 2-5 of Table III, were prepared as described in Example 2 above, using Prequel® 2000C as the hydrophobe at different Prequel® 2000C to poly(vinylamine-co-vinyl alcohol) weight ratios. Examples 2-6 through 2-11 of Table III, were prepared as described above using Precis® 900 as the hydrophobe at different Prequel® 2000C to poly(vinylamine-co-vinyl alcohol) ratios. The resulting compositions are transparent or semitransparent in solution and are stable in storage.

TABLE III

Hydrophobically Modified Poly(vinylamine-co-vinyl alcohol)

| Example | Hydrophobe | Amine Mole % of Poly (VAm-VA) | Hydrophobe/ PVAm, w/w | AS % | Viscosity (cps) | Product Appearance |
|---|---|---|---|---|---|---|
| 2-1 | Prequel ® 2000C | 20 | 0.50 | 7 | | Transparent |
| 2-2 | Prequel ® 2000C | 12 | 0.50 | 6.4 | | Transparent |
| 2-3 | Prequel ® 2000C | 12 | 0.75 | 6.5 | 352 | Semitransparent |
| 2-4 | Prequel ® 2000C | 12 | 1.00 | 6.65 | | Semitransparent |
| 2-5 | Prequel ® 2000C | 12 | 2.00 | 7.4 | 1524 | Semitransparent |
| 2-6 | Precis ® 900 | 20 | 0.50 | 6.5 | | Transparent |
| 2-7 | Precis ® 900 | 12 | 0.50 | 6.4 | | Transparent |
| 2-8 | Precis ® 900 | 12 | 0.75 | 6.5 | | semitransparent |
| 2-9 | Precis ® 900 | 12 | 1.00 | 6.65 | | semitransparent |
| 2-10 | Precis ® 900 | 20 | 2.00 | 6.5 | | semitransparent |
| 2-11 | Precis ® 900 | 12 | 2.00 | 7.3 | | semitransparent |

Example 3

Hydrophobic Hoffmann Product Prepared by Reacting a Hoffmann Vinylamine-Containing Product with Alkenyl Succinic Anhydride or Alkenyl Ketene Dimer A stirred solution of Hoffmann product (100 g, 8.5% active, Floret® HF92 AC from SNF, containing 48 mole % vinylamine units) was diluted with water (100 g) and adjusted to pH 10 by treatment with 50% aqueous sodium hydroxide. To this solution was added a specified amount of alkenyl ketene dimer (Precis® 900, Solenis, and Wilmington, Del., USA) or alkenyl succinic anhydride (Prequel® 2000C, Solenis, and Wilmington, Del., USA) dropwise over a 60 minute time period with stirring at 50° C. to 70° C. The resulting mixture was stirred at a temperature of 50° C. to 70° C. for 6 hours while maintaining the pH at 9-10 with 50% aqueous sodium hydroxide. The resulting product was cooled to room temperature and adjusted to pH 8 with concentrated hydrochloric acid to give the final hydrophobically modified product.

Examples 3-1 through 3-4 of Table IV, were prepared as described in Example 3 above, using different reactive hydrophobes at mole ratios of hydrophobe to the vinylamine content in the polymer.

TABLE IV

Hydrophobic vinylamine-containing Hoffmann product

| Example | Hydrophobe | Hydrophobe/ vinylamine mole ratio | Polymer active % | Viscosity (cps) |
|---|---|---|---|---|
| 3-1 | Precis ® 900 | 0.5 | 10.6 | 56 |
| 3-2 | Precis ® 900 | 0.1 | 8.7 | 100 |
| 3-3 | Prequel ® 2000C | 0.5 | 8.2 | 1560 |
| 3-4 | Prequel ® 2000C | 0.1 | 5.1 | 40 |

Example 4

Hydrophobic Vinylamine-Containing Polyacrylamide Polymers

A solution of hydrophobic polyvinylamine (15 g active for Example 4-4) was prepared using the procedures as described in Example 1, Example 2 or Example 3. The pH of the hydrophobic polyvinylamine was adjusted to 3.6 by adding a solution of 37% hydrochloric acid under stirring and purged with nitrogen gas for 30 minutes. Ferrous sulfate heptahydrate solution (0.35 g, 1%) was added and the temperature of the resulting solution increased to 60° C. A solution of acrylamide (35 g active solids) was dropwise added over 60 minutes under stirring while simultaneously adding 16.5 g of hydrogen peroxide solution (2.5%) over a 90 minute time period. The reaction was held at 60° C. to 65° C. for 1 hour after hydrogen peroxide addition was completed. A sodium metabisulfite solution (2 ml, 5%) was added at the end of the reaction, and the resulting mixture was then cooled to ambient temperature and pH adjusted to 7.0 using sodium hydroxide (50% by wt.) to give a hydrophobic product having an active solids in the range from 8% to 24%.

Examples from 4-1 and 4-12 were prepared using a similar procedure as used in Example 4, the Precis® 900 hydrophobically modified polymers in Example 1 were as base polymers, and the acrylamide (AM) active as percentage in the products was at different levels.

TABLE V

Alkyl Ketene dimer vinylamine-containing polyacrylamide polymers

| Example | Hydrophobe | Hydrophobe/ PVA m(w/w) | AM % in active | Product active % | Viscosity (cps) |
|---|---|---|---|---|---|
| 4-1 | Precis ® 900 | 0.25 | 85 | 15.5 | 250 |
| 4-2 | Precis ® 900 | 0.5 | 85 | 15.9 | 240 |
| 4-3 | Precis ® 900 | 0.5 | 70 | 16.1 | 1500 |
| 4-4 | Precis ® 900 | 1 | 70 | 21.0 | 665 |
| 4-5 | Precis ® 900 | 1 | 90 | 10.8 | 290 |
| 4-6 | Precis ® 900 | 1.25 | 70 | 13.0 | 1592 |
| 4-7 | Precis ® 900 | 1.5 | 70 | 17.8 | 136 |
| 4-8 | Precis ® 900 | 1.5 | 90 | 10.8 | 815 |
| 4-9 | Precis ® 900 | 2 | 70 | 15.7 | 632 |
| 4-10 | Precis ® 900 | 2 | 80 | 14.6 | 730 |
| 4-11 | Precis ® 900 | 3 | 90 | 10.9 | 1624 |
| 4-12 | Precis ® 900 | 3 | 70 | 12.9 | 1552 |

Examples from 4-13 and 4-24 were prepared using the same procedure as described in Example 4. The Precis® 900 hydrophobically modified acetylated vinylamine-containing polymers in Example 1, were used as base polymers, and the acrylamide (AM) active as percentage in the compositions are listed in Table VI.

TABLE VI

Alkyl Ketene dimer hydrophobically modified acetylated vinylamine-containing polyacrylamide polymers

| Example | Hydrophobe | Hydrophobe/ PVAm (w/w) | Acetic Anhydride/ PVAm (w/w) | Acrylamide % in active | Polymer active % | Viscosity (cps) |
|---|---|---|---|---|---|---|
| 4-13 | Precis ® 900 | 0.5 | 1 | 70 | 17.5 | |
| 4-14 | Precis ® 900 | 1 | 0.52 | 75 | 10.7 | 12400 |
| 4-15 | Precis ® 900 | 1 | 1 | 70 | 19.6 | |
| 4-16 | Precis ® 900 | 1 | 1 | 90 | 19.6 | 4900 |
| 4-17 | Precis ® 900 | 1.25 | 0.9 | 80 | 16.7 | 1964 |
| 4-18 | Precis ® 900 | 1.25 | 0.9 | 90 | 16.0 | 1290 |
| 4-19 | Precis ® 900 | 1.5 | 0.85 | 80 | 16.7 | 3279 |
| 4-20 | Precis ® 900 | 1.5 | 0.85 | 90 | 16.2 | 8000 |
| 4-21 | Precis ® 900 | 2 | 0.35 | 70 | 13.3 | |
| 4-22 | Precis ® 900 | 3 | 0.15 | 60 | 16.4 | 920 |
| 4-23 | Precis ® 900 | 3 | 0.15 | 50 | 12.7 | |
| 4-24 | Precis ® 900 | 3 | 0.15 | 70 | 9.5 | |

Examples 4-24 and 4-36 (Tables VI and VII), were prepared using the same procedure as described in Example 4. The alkyl glycidyl ether hydrophobically modified vinylamine-containing polymers in Example 1, were used as the base polymer with different levels of acrylamide (AM) active as percentage for the polymerization as indicated in Tables VI and VII.

TABLE VII

Alkyl glycidyl ether hydrophobically modified vinylamine-containing polyacrylamide polymers

| Examples | Alkyl glycidyl ether (alkyl chain length) | Alkyl glycidyl ether/PVAm w/w ratio | Acetic Anhydride/PVAm w/w ratio | Acrylamide % in active | Polymer active % | Viscosity (cps) |
|---|---|---|---|---|---|---|
| 4-24 | Hage 16 ($C_{16}$) | 0.5 | | 70 | 11.4 | |
| 4-25 | Hage 16 ($C_{16}$) | 0.5 | | 85 | 15.4 | |
| 4-26 | Hage 16 ($C_{16}$) | 1 | | 70 | 11.4 | |
| 4-27 | Hage 16 ($C_{16}$) | 1 | | 75 | 9.5 | 7000 |
| 4-28 | Hage 16 ($C_{16}$) | 2 | | 70 | 11.2 | |
| 4-29 | Hage 16 ($C_{16}$) | 2 | 0.18 | 80 | 12.5 | 1896 |
| 4-30 | Hage 16 ($C_{16}$) | 2 | 0.09 | 80 | 9.9 | 714 |
| 4-31 | Hage 16 ($C_{16}$) | 3 | | 50 | 18.4 | 928 |
| 4-32 | Hage 16 ($C_{16}$) | 3 | | 70 | 13.4 | 368 |
| 4-33 | Epodil ® 474 ($C_{16}$) | 1 | | 70 | 15.1 | 884 |
| 4-34 | Epodil ® 474 ($C_{16}$) | 2 | | 70 | 13.9 | 920 |
| 4-35 | 2-EHGE | 1 | | 70 | 17.4 | 1118 |
| 4-36 | 2-EHGE | 2 | | 70 | 15.5 | 558 |

Examples from 4-37 and 4-41 were prepared using the same procedure as described in Example 4. The Precis® 900 hydrophobically modified vinylamine-containing polymers with PEGMO in Example 1, were used as base polymers, and the acrylamide (AM) active as percentage in the products was at different levels (see Table IX).

TABLE IX

Alkyl Ketene dimer hydrophobically modified acetylated vinylamine-containing polyacrylamide polymers

| Example | Examples as the base material | Precis ® 900/PVAm (w/w) | PEGMO/ PVAm (w/w) | Acrylamide % in active | Polymer active % | Viscosity (cps) |
|---|---|---|---|---|---|---|
| 4-37 | 1-3-1 | 1 | 1 | 70 | 15.8 | 3870 |
| 4-38 | 1-6-1 | 2 | 1 | 70 | 21.7 | 1650 |
| 4-39 | 1-7-1 | 3 | 3 | 70 | 13.7 | 3000 |
| 4-40 | 1-3-2 | 1 | 2 | 70 | 19.8 | 8240 |
| 4-41 | 1-6-2 | 2 | 2 | 70 | 19.3 | 5470 |

Example 5

Alternative Process for Producing Hydrophobic Vinylamine-Containing Polyacrylamide Polymers Example 5, represents a one pot reaction procedure for making the current vinyl polymers. A solution of polyvinylamine as the base polymer for the polymerization was added to a reaction flask, stirred and the pH adjusted to 3.6 by dropwise addition of a 37% hydrochloride acid solution to the flask. An acrylamide solution was added to the solution with stirring and purged with nitrogen gas for 30 minutes. Ferrous sulfate solution (300 ppm based on acrylamide) was added to the purged solution and the temperature was adjusted to 65° C. A hydrogen peroxide solution (0.5 w/w % based on acrylamide) was dropwise added to this over 120 minutes. The reaction was held at 70° C. for 60 minutes after hydrogen peroxide addition was completed. The reaction solution was then cooled to ambient temperature and the pH adjusted to 5.0 using sodium hydroxide (50%) to give the product an active solids in the range from 6% to 18%. Due to the exothermic nature of acrylamide polymerization this one pot reaction procedure works best for synthesis of the polymers containing more than 50% of hydrophobic vinylamine-containing base polymer.

Example 6

Evaluation of Hydrophobic Vinylamine-Containing Cationic Polymers as Paper Softeners in Papermaking Applications The softness measured by the Handle of Meter (H-o-M) instrument, coefficient of friction, water drop sizing and tensile strength properties of paper sheets made with the hydrophobic vinylamine-containing polymers of the above examples were compared with the properties of flat paper sheet made with a benchmark softener imidazoline (Prosoft® TQ218A, from Solenis, Wilmington, Del., USA) at equal active dosages.

The paper was made using a papermaking machine located at 500 Hercules Rd., Wilmington Del. The paper pulp was 70% Quinessec hardwood bleached kraft and 30% Rayonier softwood bleached kraft refined separately using Andritz double desk refiner to 500 ml CSF freeness and then mixed to produce a pulp with 100 ppm hardness and 50 ppm alkalinity. The system pH was 7.0 with the stock temperature at 50° C. The basis weight was either 25 lbs. per 3000 ft$^2$ or 16 lbs. per 3000 ft$^2$. The hydrophobic vinylamine-containing polymers used in Examples 1-4 and Prosoft® TQ218A, were added as softeners to the wet end of the papermaking machine at a level of 0.3 weight % of polymer active versus dry weight paper pulp. Dry tensile (TAPPI Test Method T494, om-01) and wet tensile properties were determined. The H-o-M, coefficient of friction, water drop sizing and tensile strength of the flat (uncreped) paper sheets made with the current hydrophobic polyvinylamines were compared with the paper made with Prosoft® TQ218A. The results shown in Table X are expressed on a percentage basis versus that of the blank.

TABLE X

H-o-M Softness, coefficient of friction and tensile strength of the paper sheet made with Precis 900 Hydrophobically Modified Hercobond® 6363

| Examples | Examples of present invention | Hydrophobic cationic polymer | Softness (H-o-M) % | Coefficient of friction % | GMT % |
|---|---|---|---|---|---|
| Comparative example 6-1 | Blank | None | 100 | 100 | 100 |
| Comparative example 6-2 | Prosoft® TQ218A | Benchmark | 78.4 | 86.2 | 92.3 |
| Example 6-1 | Example 1-3 | Precis® 900-PVAm (1:1) | 86.5 | 83.3 | 108.0 |
| Example 6-2 | Example 1-6 | Precis® 900-PVAm (2:1) | 80.6 | 79.2 | 102.2 |
| Example 6-3 | Example 1-7 | Precis® 900-PVAm (3:1) | | 70.0 | 93.5 |
| Example 6-4 | Example 1-8 | Precis® 900-PVAm (4:1) | | 73.1 | 100.6 |
| Example 6-5 | Example 1-9 | Precis® 900-PVAm (5:1) | 78.4 | 68.3 | 99.5 |
| Example 6-6 | Example 1-10 | Precis® 900-PVAm (6:1) | 72.9 | 83.0 | 97.4 |
| Example 6-7 | Example 1-19 | Precis® 900-AcPVAm (2:1) | | 63.8 | 95.6 |
| Example 6-8 | Example 1-22 | Precis® 900-AcPVAm (5:1) | 71.5 | 79.4 | 104.7 |

Results indicated that adding 100 weight % of Precis® 900 to Hercobond® 6363 or acetylated Hercobond® 6363 via amidation reaction gave good reduction in COF value when compared with the benchmark Prosoft® TQ218A, while at the same time exhibiting higher tensile strength (see Example 6-1 to 6-8 in Table IX). The flat paper sheets made with hydrophobically modified PVAm had comparable or lower Handle-of-Meter value relative to that of the flat paper made with Prosoft® TQ218A (Example 6-7 to 6-8), which indicates softer paper sheets. When the primary amine of PVAm was partially blocked via acetylation, the products gave reduced wet strength and reduced water sizing effect of the paper sheet.

TABLE XI

H-o-M Softness, coefficient of friction and tensile strength of the paper sheet made with the hydrophobic cationic polymers of the present invention

| Examples | Examples of present invention | Hydrophobic cationic polymer | Softness (H-o-M) % | Coefficient of friction % | GMT % |
|---|---|---|---|---|---|
| Comparative Example 6-1 | Blank | None | 100.0 | 100.0 | 100.0 |
| Comparative Example 6-2 | Prosoft® TQ218A | Benchmark | 83.8 | 95.6 | 93.4 |
| Example 6-9 | Example 2-3 | Prequel® 2000C-Poly(VAm-VA) | 81.9 | 92.1 | 101.2 |
| Example 6-10 | Example 2-4 | Prequel® 2000C-Poly(VAm-VA) | 80.9 | 94.6 | 98.2 |
| Example 6-11 | Example 2-5 | Prequel® 2000C-Poly(VAm-VA) | 85.5 | 89.2 | 98.9 |

Example 6-9 to 6-10, Table XI, demonstrates the hydrophobic polyvinylamine reduced H-o-M value (softer paper sheets), lower COF and higher dry tensile compared with Prosoft® TQ218A. The products gave lower water drop sizing than Prosoft® TQ218A, indicating better dispersability of the paper sheets.

TABLE XII

H-o-M Softness, coefficient of friction and tensile strength of the paper sheet made with the hydrophobic cationic polymers of the present invention

| Examples | Examples of present invention | Hydrophobic cationic polymer | Softness (H-o-M) % | Coefficient of friction % | GMT % |
|---|---|---|---|---|---|
| Comparative example 6-1 | Blank | None | 100 | 100 | 100 |
| Comparative example 6-2 | Prosoft ® TQ218A | Benchmark | 92.6 | 87.2 | 90.2 |
| Example 6-12 | Example 4-26 | Hage16 ®-PVAm/PAM | 94.5 | 87.0 | 114.0 |
| Example 6-13 | Example 4-33 | Epodil ® 478-PVAm/PAM | 97.4 | 90.2 | 120.2 |
| Example 6-14 | Example 4-35 | 2-EHGE ®-PVAm/PAM | 98.1 | 95.2 | 120.6 |
| Example 6-15 | Example 4-4 | Precis ® 900-PVAm/PAM | 94.7 | 90.4 | 112.2 |
| Example 6-16 | Example 4-9 | Precis ® 900-PVAm/PAM | 95.0 | 81.6 | 105.1 |
| Example 6-17 | Example 4-10 | Precis ® 900-PVAm/PAM | 93.8 | 92.6 | 108.0 |
| Example 6-18 | Example 4-37 | Precis ® 900-PVAm-PEGMO/PAM | 98.5 | 70.4 | 101.5 |
| Example 6-19 | Example 4-38 | Precis ® 900-PVAm-PEGMO/PAM | 96.1 | 77.7 | 112.6 |
| Example 6-20 | Example 4-39 | Precis ® 900-PVAm-PEGMO/PAM | 94.0 | 88.3 | 108.5 |

Examples 6-12 thru 6-19 of Table XII, further demonstrates that the acrylamide polymers of the hydrophobically modified vinylamine-containing polymers (see Example 4) reduced H-o-M value (softer paper sheets), had lower COF and higher dry tensile relative to the blank and provided improved tensile strength. The products gave comparable water drop sizing to the paper sheets versus that of Prosoft® TQ218A.

Example 7

Preparation of Hydrophobically Modified Vinylamine-Containing Softener Emulsions and Softener/Nonionic Surfactant Blends The hydrophobically modified vinylamine-containing softeners listed in Table XII, were emulsified using the following method. A 50 g sample of the softener (a 10% solids dispersion in water) was heated to 65° C. in an oven. The heated sample was then loaded into a heated blender jar (70° C.) along with 50 g of hot water (70° C.). The hot mixture was immediately blended on "high" for 90 seconds. If needed, the pH of the emulsion was adjusted with dilute $H_2SO_4$ or $NaCO_3$ after blending (target pH about 7-8). The emulsion (5% solids) was allowed to cool to room temperature before addition to the formed tissue paper.

The method described in Example 7, was used to prepare the softener/nonionic surfactant blends listed in Table XII. A 30 g sample of the softener (a 10% solids emulsion in water) was heated to 65° C. in an oven. The heated sample was then loaded into a heated blender jar (70° C.) along with 68 grams of hot water (70° C.) and 2 g of the desired non-ionic surfactant (e.g. Huntsman Surfonic® L24-12 for the 60:40 blends). The hot mixture was immediately blended on "high" for 90 seconds. If needed, the pH of the emulsion was adjusted with dilute $H_2SO_4$ or $NaCO_3$ after blending (target pH about 7-8). The emulsion (5% total solids) was allowed to cool to room temperature before addition to the formed tissue paper.

Example 8

Surface Addition of Hydrophobic Vinylamine-Containing Softener Emulsions and Softener/Nonionic Surfactant Blends Rolls of commercial, creped bath tissue were surface treated with the hydrophobic vinylamine-containing softeners using a Little Giant Speedy Label Maker offset printing press (See FIG. 1, Sohn Manufacturing Inc. Elkhart Lake, Wis.). A single-ply tissue paper available from Office Depot was used for the evaluations (Marcal tissue, continuous roll, 15 $g/m^2$ basis weight).

The amount of softener added to the tissue was controlled by adjusting the % active solids of the hydrophobic polyvinylamine emulsion. The % active solids of the emulsion was selected based on the % wet "pick-up" of the tissue on the off-set press and the desired softener addition level. Wet pick-up was calculated using the difference in the dry weight of the tissue before printing and the wet-weight of the tissue after printing. For example, a 2.5% solids emulsion at 10% wet pick-up gave a softener addition level of 0.25% or 5 pounds per ton (ppt) of treated tissue. The softener treated tissue was dried for 30 minutes at 80° C., then allowed to equilibrate at 50% relative humidity and 72° C. before testing.

Example 9

Evaluation of Precis® 900 Hydrophobically Modified Polyvinylamine Softener Emulsions and Softener/Nonionic Surfactant Blends—Surface Addition Three Precis® 900 hydrophobically modified polyvinylamine softeners were tested using the surface addition method described in Example 8. The softeners were made at Precis® 900:polyvinylamine ratios of: 0.25:1, 0.5:1, and 1:1 using the method described in Example 1. Each of the three softeners was tested "as is," and as a 60:40, and as a 20:80 blend with Polyethylene glycol (400 MW) mono-oleate, a commercial tissue softener available from Manufacturers Chemicals, Cleveland, Tenn. Emulsions of the Precis® 900 hydrophobically modified polyvinylamine and Precis® 900 hydrophobically modified polyvinylamine/non-ionic surfactant blends were made using the methods described in Example 7. The total amount of Precis® 900 hydrophobically modified polyvinylamine softener/PEGMO addition level was fixed at 0.25% for the "as is" and the PEGMO blends. Machine direction (MD) tensile strength (MTS System-5 Testing Machine) and Handle-o-Meter softness (H-o-M, Thwing-Albert Instrument Company—Model #211-300) were used as measures of softener performance. Standard Tappi methods were used for both tests: tensile strength (T-494) and H-o-M softness (T-498).

ProSoft® TQ218A (a commercial tissue softener available from Solenis Inc., Wilmington, Del.) and PEGMO were evaluated as commercial softener controls. The softener controls were tested to help quantify the benefits of the Precis® 900 hydrophobically modified polyvinylamine softeners. Both controls were tested at the 0.25% addition level. A sample of water treated tissue was also tested as "Blank."

The results of MD tensile strength and H-o-M softness testing of the surface treated tissue are shown in Table XII. The ProSoft® TQ218A and PEGMO controls gave the expected improvements in H-o-M softness (versus the water treated "Blank," A lower H-o-M value implies softer tissue). The ProSoft® TQ218A and PEGMO controls, however, had a negative effect on tensile strength (versus the water treated "Blank"). Although improved softness was obtained with the controls, there was also a reduction in tensile strength.

Figure 2:
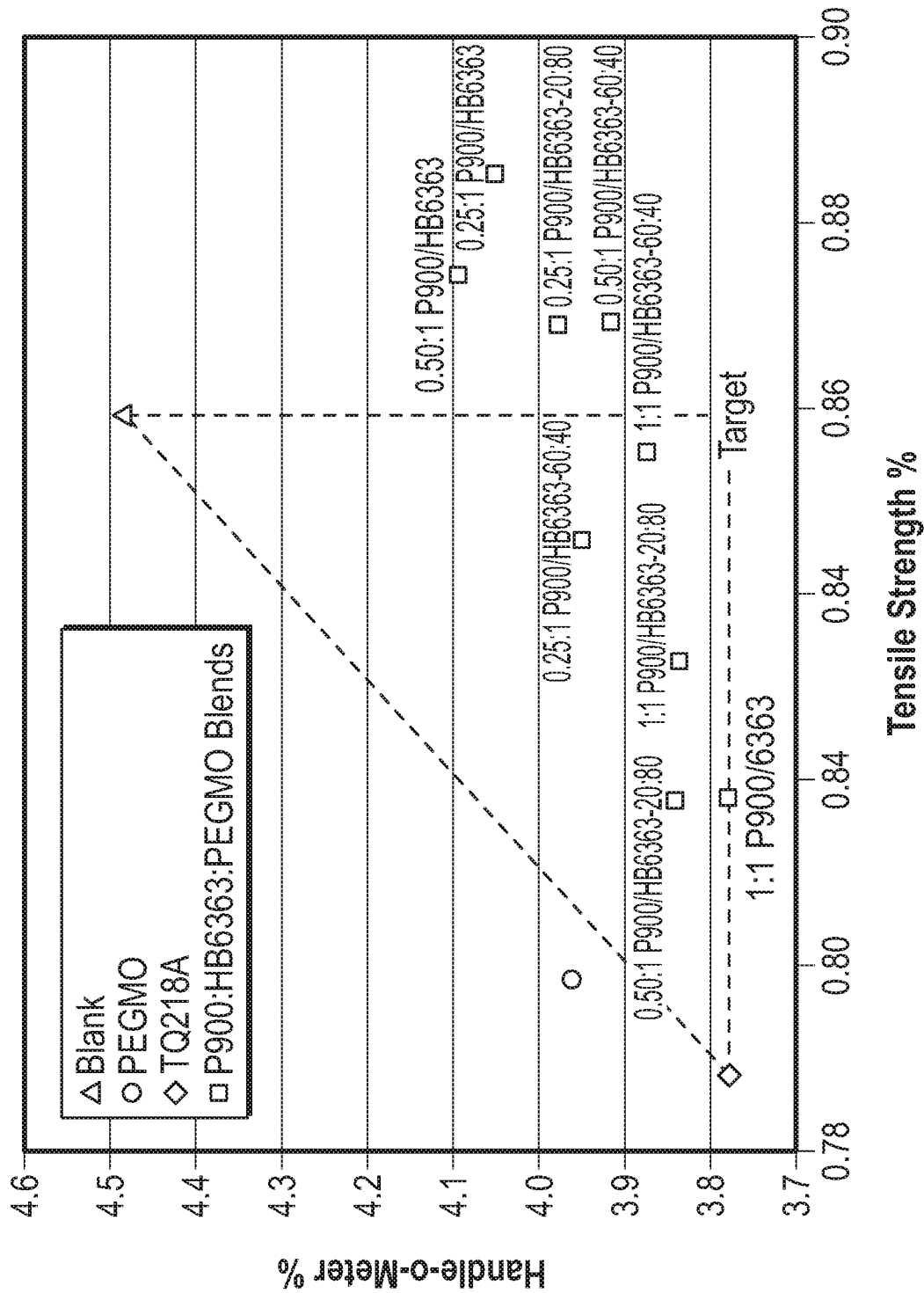
FIG. 2, shows the softness property and tensile strength of Precis® 900 hydrophobically modified polyvinylamine based compositions and their blends with a long chain polyethylene glycol (PEGMO). TQ218A shown in FIG. 2, stands for ProSoft® TQ218A. P900:PVAM shown in FIG. 2, stands for Precis® 900 hydrophobically modified polyvinylamine.

All three Precis® 900 hydrophobically modified polyvinylamine softeners gave improved "balances" of H-o-M softness and tensile strength. The 0.25:1 and 0.5:1 Precis® 900 hydrophobically modified polyvinylamine softeners gave surface treated tissue that was softer (lower H-o-M value) and stronger (higher tensile strength) than the untreated "Blank." The 1:1 Precis® 900 hydrophobically modified polyvinylamine softener gave treated tissue that was as soft as the ProSoft® TQ218A and PEGMO controls, but at a significantly higher tensile strength. The improved relationship between tissue softness and tensile strength obtained with Precis® 900 hydrophobically modified polyvinylamine softeners is shown graphically in FIG. 2.

The 60:40 and 20:80 blends of the Precis® 900 hydrophobically modified polyvinylamine softeners and PEGMO shown in Table XIII, also produced surface treated tissue paper with improved balances of H-o-M softness and tensile strength. In general, the tissue paper treated with Precis® 900 hydrophobically modified polyvinylamine PEGMO blends were as soft as the tissue paper treated with the ProSoft® TQ218A and PEGMO commercial softener controls and had a significantly higher tensile strength.

TABLE XIII

Precis ® 900 Hydrophobically Modified Polyvinylamine Printed Onto Tissue - w/wo PEGMO - Surface Addition - H-o-M Softness and Tensile Strength

| Examples | Examples of present invention | Hydrophobic cationic polymer | H-o-M Softness | Tensile Strength |
|---|---|---|---|---|
| Comparative Example 7-1 | Blank | None | 100% | 100% |
| Comparative Example 7-2 | Prosoft ® TQ218A | None | 84.2 | 91.7 |
| Comparative Example 7-3 | Polyethylene Glycol Mono-Oleate (PEGMO) | None | 88.3 | 92.9 |
| Example 7-4 | Example 1-1 | Precis ® 900-PVAm (1:1) | 84.2 | 95.2 |
| Example 7-5 | Example 1-2 | Precis ® 900-PVAm (0.5:1) | 91.3 | 101.8 |
| Example 7-6 | Example 1-3 | Precis ® 900-PVAm (0.25:1) | 90.3 | 103.0 |
| Example 7-7 | Example 1-1 | Precis ® 900-PVAm (1:1) 60:40 Blend with PEGMO | 86.4 | 99.5 |
| Example 7-8 | Example 1-2 | Precis ® 900-PVAm (0.5:1) 60:40 Blend with PEGMO | 87.2 | 101.2 |
| Example 7-9 | Example 1-3 | Precis ® 900-PVAm (0.25:1) 60:40 Blend with PEGMO | 88.0 | 98.4 |
| Example 7-10 | Example 1-1 | Precis ® 900-PVAm (1:1) 20:80 Blend with PEGMO | 85.5 | 96.9 |
| Example 7-11 | Example 1-2 | Precis ® 900-PVAm (0.5:1) 20:80 Blend with PEGMO | 85.6 | 95.2 |
| Example 7-12 | Example 1-3 | Precis ® 900-PVAm (0.25:1) 20:80 Blend with PEGMO | 88.7 | 101.1 |

Example 10

Evaluation of a Precis® 900 Hydrophobically Modified Vinylamine-Containing Polyacrylamide Softener and Softener/Nonionic Surfactant Blends—Surface Addition An emulsion of a Precis® 900 hydrophobically modified vinylamine-containing polyacrylamide softener (Example 4-3) was made using the method described in Example 7. The softener emulsion was evaluated using the surface addition method described in Example 8. The Precis® 900 hydrophobically modified vinylamine-containing polyacrylamide emulsion was tested "as is" and co-emulsified with PEGMO (7:3 blend). As can be seen in Table XIV, the total amount of Precis® 900 hydrophobically modified vinylamine-containing polyacrylamide/PEGMO was fixed at 0.25% for the "as is" and the PEGMO blend.

Three controls were also evaluated. PEGMO was evaluated as a commercial softener control. An unmodified sample of the vinylamine-containing polyacrylamide was evaluated as a dry strength control (made using the method described in Example 4, but without the addition of Precis® 900). In addition, the unmodified vinylamine-containing polyacrylamide was tested as a 7:3 polymer:PEGMO blend. All three controls were tested at a 0.25% addition level. A sample of water treated tissue was tested as a "Blank". Machine direction (MD) tensile strength and H-o-M softness were used as measures of softener performance.

Figure 3:
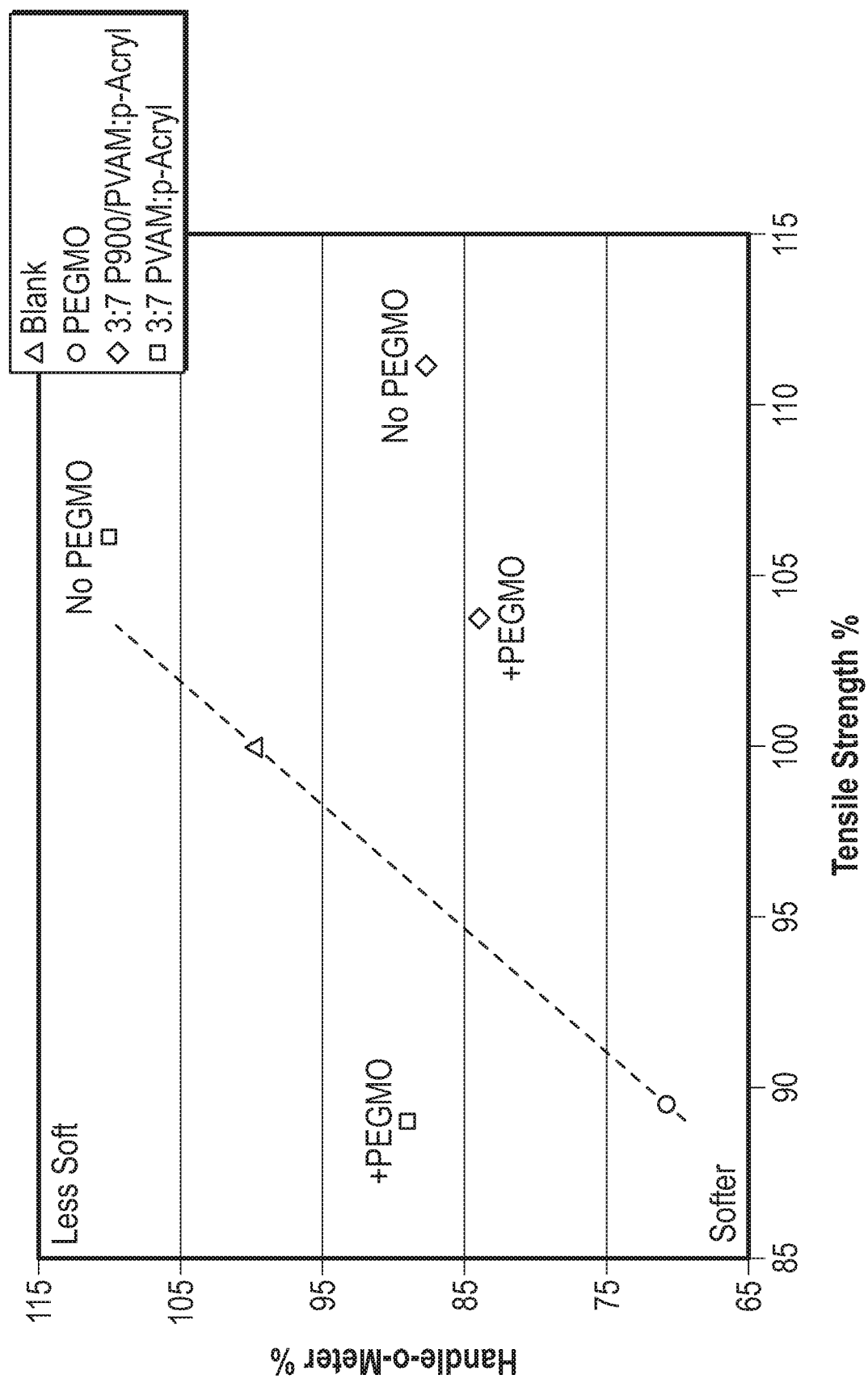
FIG. 3, shows the softness property and tensile strength of Precis® 900 hydrophobically modified vinylamine polyacrylamide polymers that is abbreviated as P900/PVAM:p-Acryl with and without a long chain polyethylene glycol.

The results of MD tensile strength and H-o-M softness testing of the surface treated tissue are shown in Table XIII and FIG. 3. The PEGMO softener control gave expected improvement in H-o-M softness (versus the water treated "Blank," a lower H-o-M value implies softer tissue.). The PEGMO control, however, had a negative effect on tensile strength (versus the water treated "Blank"). Although improved softness was obtained by adding PEGMO to the composition, the addition came at the expense of reduced tensile strength. The unmodified vinylamine-containing polyacrylamide dry strength control increased the tensile strength of the tissue paper, but reduced the softness of the treated tissue paper (higher H-o-M value than the "Blank"). The unmodified vinylamine-containing polyacrylamide/PEGMO blend improved the softness of the treated tissue, but resulted in reduced tensile strength.

The Precis® 900 hydrophobically modified vinylamine-containing polyacrylamide softener and the corresponding PEGMO blend gave improved "balances" of H-o-M softness and tensile strength. Both gave surface treated tissue that was softer (lower H-o-M value) and stronger (higher tensile strength) than the untreated "Blank."

TABLE XIV

Precis ® 900 Hydrophobically Modified Vinylamine-
Containing Polyacrylamide Polymers - w/wo PEGMO - Surface
Addition - H-o-M Softness and Tensile Strength

| Examples | Examples of present invention | Hydrophobic cationic polymer | H-o-M Softness | MD-Tensile |
|---|---|---|---|---|
| Comparative Example 8-1 | Blank | None | 100% | 100% |
| Comparative Example 8-2 | | Polyethylene Glycol Mono-Oleate (PEGMO) | None | 89.4 | 71.2 |
| Comparative Example 8-3 | | Unmodified Hercobond ® 6363 - polyacrylamide (1.5:8.5) polymer | 106.0 | 110.3 |
| Comparative Example 8-4 | | Comparative Example 8-3 7:3 blend with PEGMO | 88.9 | 89.3 |
| Example 8-5 | Example 4-3 | Precis ® 900-Hercobond ® 6363 (0.5:1) 3:7 polyacrylamide polymer | 111.0 | 88.4 |
| Example 8-6 | Example 4-3 | Precis ® 900-Hercobond ® 636 (0.5:1) 3:7 polyacrylamide polymer 7:3 blend with PEGMO | 103.6 | 84.8 |

Example 11

Evaluation of Precis® 900 and Alkenyl Succinic Anhydride (ASA) Hydrophobically Modified Vinylamine-Vinyl Alcohol Copolymer Softeners and Softener/Nonionic Surfactant Blends—Surface Addition Emulsions of a Precis® 900 (Example 2-9) and an ASA (Example 2-4) hydrophobically modified vinylamine-vinyl alcohol copolymer softeners were made using the method described in Example 7. The softener emulsions were evaluated using the surface addition method described in Example 8. The Precis® 900 hydrophobically modified poly(vinylamine-co-vinyl alcohol) emulsion was tested "as is" and co-emulsified with PEGMO (7:3 blend). The total softener and softener/PEGMO addition level was fixed at 0.25 for the "as is" softener emulsions and the PEGMO blend.

Two commercial controls were tested to quantify the benefits of the Precis 900 and ASA hydrophobically modified poly(vinylamine-co-vinyl alcohol) softeners. ProSoft® TQ218A was evaluated as a commercial softener control. In addition, an unmodified sample of the poly(vinylamine-co-vinyl alcohol) (Sekisui Inc.) was evaluated as a dry strength control. Both controls were tested at a 0.25% addition level. A sample of water treated tissue was tested as a "Blank." MD tensile strength and H-o-M softness were used as measures of softener performance.

Figure 4:
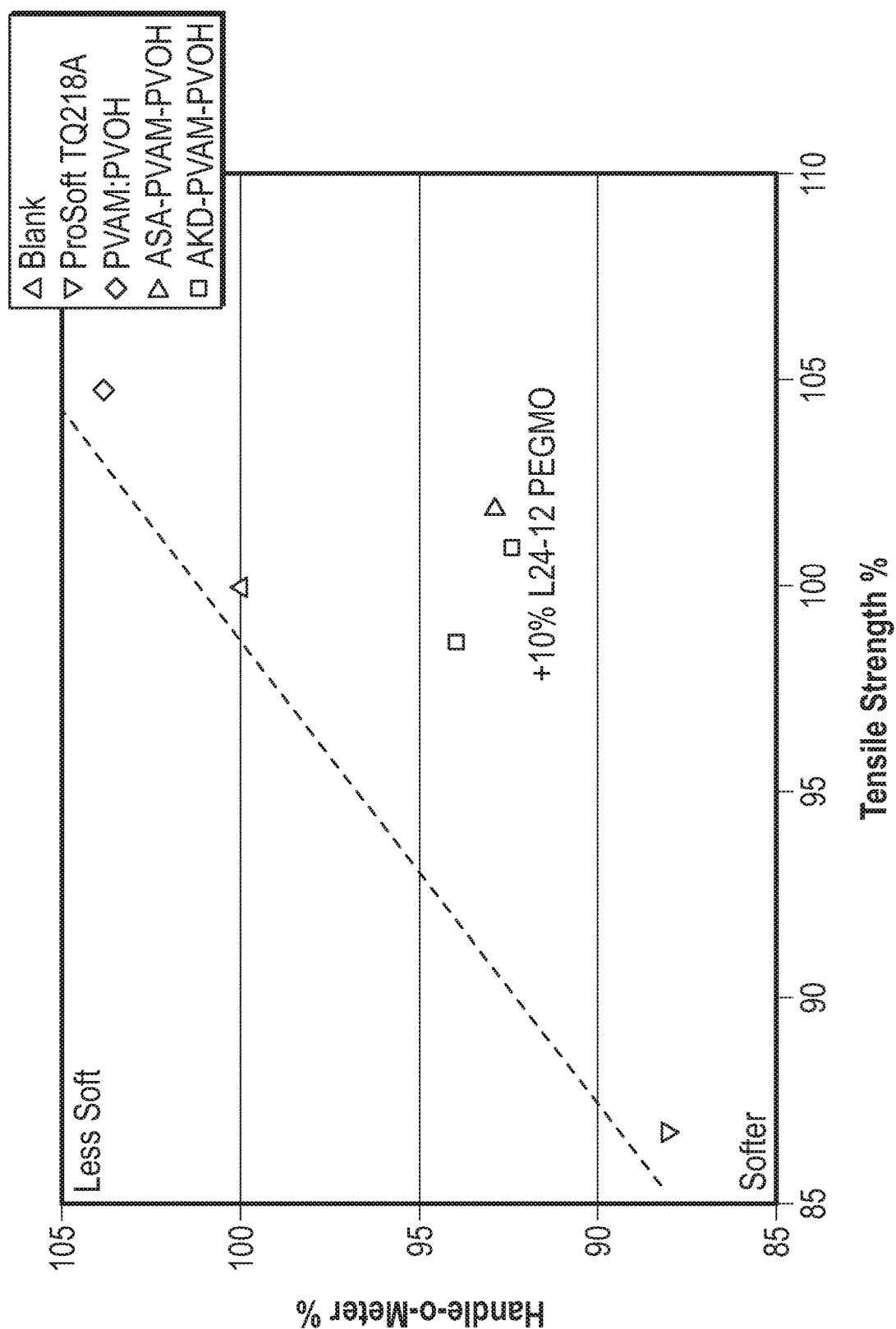
FIG. 4, shows the softness property and tensile strength of Precis® 900 (AKD) and Prequel® 2000C (ASA) hydrophobically modified poly(vinylamine-co-vinyl alcohol). PVAm:PVOH stands for poly(vinylamine-co-vinyl alcohol).

The results of MD tensile strength and H-o-M softness testing of the surface treated tissue are shown in Table XIV and FIG. 4. The ProSoft® TQ218A softener control gave the expected improvement in H-o-M softness (versus the water treated "Blank," a lower H-o-M value implies softer tissue). The ProSoft® TQ218A control, however, had a negative effect on tensile strength (versus the water treated "Blank"). Although improved softness was obtained by adding ProSoft® TQ218A, there was also a reduction tensile strength. The unmodified vinylamine-vinyl alcohol copolymer dry strength control increased the tensile strength of the tissue, but reduced the softness (higher H-o-M value when compared with the "Blank").

The Precis® 900 and ASA hydrophobically modified vinylamine-vinyl alcohol copolymer softeners, and the Precis® 900 hydrophobically modified vinylamine-vinyl alcohol copolymer PEGMO blend, gave improved "balances" of Handle-o-Meter softness and tensile strength. All three gave surface treated tissue that was softer (lower H-o-M value) and just as strong as the untreated "Blank."

TABLE XV

Precis ® 900 and ASA Hydrophobically Modified
Poly(vinylamine-co-vinyl alcohol) polymer - w/wo PEGMO -
Surface Addition - H-o-M Softness and Tensile Strength

| Examples | Examples of present invention | Hydrophobic cationic polymer | H-o-M Softness | MD-Tensile |
|---|---|---|---|---|
| Comparative Example 9-1 | Blank | None | 100% | 100% |
| Comparative Example 9-2 | ProSoft ® TQ218A | None | 88.1 | 86.8 |
| Comparative Example 9-3 | Commercial Sample | Unmodified poly(vinylamine-co-vinyl alcohol) 12:88 ratio | 103.8 | 104.8 |
| Example 9-4 | Example 2-4 | 1:1 Prequel ® 2000C hydrophobically modified poly(vinylamine-co-vinyl alcohol) | 92.8 | 101.9 |
| Example 9-5 | Example 2-9 | 1:1 Precis ® 900 hydrophobically modified poly(vinylamine-co-vinyl alcohol) | 94.1 | 98.7 |
| Example 9-6 | Example 2-9 | 1:1 Precis ® 900 hydrophobically modified poly(vinylamine-co-vinyl alcohol) 7:3 blend with PEGMO | 92.5 | 101.0 |

Example 12

Evaluation of Hydrophobic Vinylamine-Containing Cationic Polymers for Bulk Improvement in Printing and Writing Paper Grade Paper bulkiness was determined by basis weight and caliper, tensile and ZDT strength properties of paper sheets made with the hydrophobic vinylamine-containing polymers of the present invention were compared with the properties of paper sheet made with a benchmark softener imidazoline (Prosoft® TQ218A, from Solenis, Wilmington, Del., USA) at equal active dosages.

The paper was made using a papermaking machine located at 500 Hercules Rd., Wilmington Del. The paper pulp was 70% Quinessec hardwood bleached kraft and 30% Rayonier softwood bleached kraft refined separately using Andritz double desk refiner to 450 ml CSF freeness and then mixed to produce a pulp with 100 ppm hardness and 50 ppm alkalinity. The system pH was 7.5 with the stock temperature at 50° C. The basis weight was 50 lbs. per 3000 ft2. The hydrophobic vinylamine-containing polymers in the above examples and Prosoft® TQ218A were added as softeners to the wet end of the papermaking machine at the level of 0.1 to 0.4 weight % of polymer active versus dry paper pulp. Stalok 300 (AE Staley, Decatur, Ill.) was added at stock pump inlet at 0.75%. Prequel 1000 (0.08% Solenis, Wilmington, Del.) and alum (0.25%) were added to the third mixer and fourth mixer respectively. Single Nip calendering pressure was set up at 40 psi loadings. Dry tensile (TAPPI Test Method T494, om-01) and ZDT were determined. The bulkiness and strength properties of the paper sheets made with the examples of the present invention were compared with that made with Prosoft® TQ218A, and are expressed as % versus that of blank in Table XIIIV.

TABLE XVI

Bulkiness, tensile and ZDT strength of paper sheet made with hydrophobic cationic vinylamine based polymers compared to Prosoft ® TQ218A

| Examples | Product Examples of present invention | Hydrophobic cationic polymer | Dosage (% vs dry fiber) | Bulkiness % | GMT % | ZDT % |
|---|---|---|---|---|---|---|
| Comparative example 6-1 | Blank | None | | 100 | 100 | 100 |
| Comparative example 6-2 | Prosoft ® TQ218A | Benchmark | 0.2 | 102.1 | 81.8 | 73.0 |
| | | | 0.4 | 106.0 | 67.2 | 52.6 |
| Example 12-1 | Example 4-32 | $C_{16}$GE (3-1)PVAm-PAM (30-70) | 0.2 | 104.3 | 105.0 | 98.6 |
| | | | 0.4 | 102.1 | 103.3 | 97.4 |
| Example 12-2 | Example 1-31 | $C_{16}$GE (5-1)PVAm | 0.2 | 108.5 | 85.8 | 75.6 |
| | | | 0.4 | 107.5 | 78.0 | 69.5 |

Example 12-1 in Table XIIIV demonstrated increased paper bulkiness while provided higher GMT tensile.

Example 12-2 gave higher bulkiness improvement that Prosoft TQ218A (comparative example 6-2) and less negative impact on GMT and ZDT tensile strength.

The hydrophobic cationic vinylamine based polymers of the present invention were also evaluated in combination with anionic polymers, in this evaluation the Hercobond® 2000 (available from Solenis, Wilmington, Del., USA), for printing and writing paper bulkiness improvement. The effect of those polymers on paper sizing was evaluated using HST sizing machine.

TABLE XVII

Bulkiness, tensile, ZDT and HST of paper sheets made with hydrophobic cationic vinylamine based polymers compared to Prosoft ® TQ218A

| Examples | Product Examples of present invention | Hydrophobic cationic polymer (dosage vs. dry fiber) | Co-additive (dosage vs dry fiber) | Bulk % | GMT % | ZDT % | HST Sizing (sec.) |
|---|---|---|---|---|---|---|---|
| Comparative example 6-1 | Blank | None | | 100 | 100 | 100 | 146 |
| Comparative example 6-2 | Prosoft ® TQ218A | TQ218A (0.2%) | 0.2 | 100.0 | 77.5 | 77.1 | 0 |
| | | TQ218A (0.4%) | 0.4 | 112.2 | 68.8 | 54.6 | 0 |
| Example 12-3 | Example 1-25 | $C_{12}$AGE-PVAm (1:1) (0.2%) | | 105.6 | 102.2 | 109.6 | 628 |
| | | $C_{12}$AGE-PVAm (1:1) (0.4%) | | 108.5 | 94.2 | 97.4 | 1072 |
| Example 12-4 | | $C_{12}$AGE-PVAm (1:1) (0.2%) | Hercobond ® 2000 (0.2%) | 105.6 | 102.1 | 108.3 | 658 |
| | | $C_{12}$AGE-PVAm (1:1) (0.4%) | | 110.3 | 99.2 | 99.3 | 736 |
| Example 12-5 | Example 1-28 | $C_{12}$AGE-PVAm (2:1) (0.2%) | | 109.0 | 85.2 | 78.3 | 277 |
| | | $C_{12}$AGE-PVAm (2:1) (0.4%) | | 107.3 | 85.5 | 77.6 | 369 |
| Example 12-6 | | $C_{12}$AGE-PVAm (2:1) (0.2%) | Hercobond ® 2000 (0.2%) | 106.5 | 98.2 | 95.2 | 512 |
| | | $C_{12}$AGE-PVAm (2:1) (0.4%) | | 108.1 | 94.0 | 84.6 | 111 |

TABLE XVII-continued

Bulkiness, tensile, ZDT and HST of paper sheets made with hydrophobic cationic vinylamine based polymers compared to Prosoft® TQ218A

| Examples | Product Examples of present invention | Hydrophobic cationic polymer (dosage vs. dry fiber) | Co-additive (dosage vs dry fiber) | Bulk % | GMT % | ZDT % | HST Sizing (sec.) |
|---|---|---|---|---|---|---|---|
| Example 12-7 | Example 4-38 | P900-PVAm-PEGMO/PAM, 0.2 | | 101.1 | 94.3 | 95.8 | 17 |
| | | P900-PVAm-PEGMO/PAM, 0.2 | | 103.8 | 93.0 | 89.6 | 6 |

The results in Table XVII, demonstrates improved bulkiness in each of Examples 6-1, 6-2 and 12-3 thru 12-7. Several examples (Example 12-3, 12-4, 12-6 and 12-7) maintained most of the GTM strength while the benchmark Prosoft® TQ218A (Comparative example 6-2) reduced the strength property significantly. Prosoft® TQ218A also reduced the HST sizing to zero while several example provided improved sizing effect on the paper sheet. The combination of a hydrophobic cationic polymer of the present invention with Hercobond® 2000 (Example 12-6) gave higher GMT strength than the cationic polymer alone (Example 12-5). Results indicated Hercobond® 2000 improved strength property with minimal impact on bulkiness of the paper sheet made with the hydrophobic cation vinylamine-containing polymers of the present invention.

While the present compositions, methods of making the compositions and the use of these compositions has been described with respect to particular embodiments thereof, it is apparent that numerous other forms and modifications will be obvious to those skilled in the art. The appended claims should be construed to cover all such obvious forms and modifications which are within the true spirit and scope of the present invention.

We claim:

1. A hydrophobic vinylamine-containing polymer composition comprising hydrophobically modified vinylamine repeating units having the formula (I):

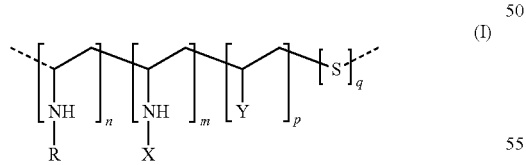

wherein R is a hydrogen or an acetyl group or a reacted α, β-unsaturated alkyl carbonyl compound through Michael addition by vinylamine in the polymer; Y is selected from the group consisting of a hydroxyl, carboxylic acid and acid amide; S is a repeating unit of polymerized diallyl dimethyl ammonium chloride; X is selected from the group consisting of formula (II), (III), (IV), (V), (VI), (VII), (VIII) and (IX):

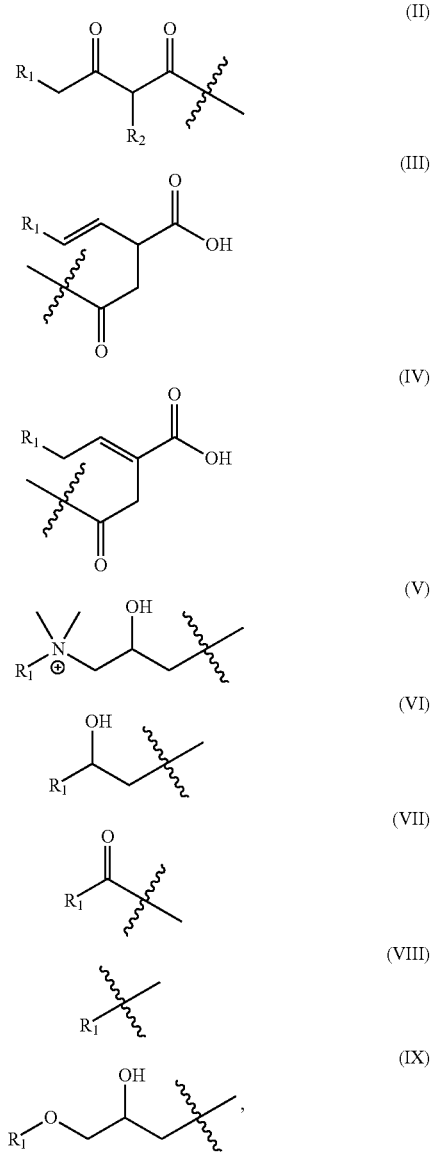

wherein $R_1$ and $R_2$, identically or differently, are a straight chain, branched aliphatic, olefinic or aromatic group having up to 22 carbon atoms and up to 4 double bonds, and wherein the dashed lines are the bonds connecting the repeating units of Formula (I) with the group consisting of Formula (II), (III), (IV), (V), (VI), (VII), (VIII) and (IX), and wherein n is from 0 mole % to about 99 mole %, m is from about 0.1 mole % to about 90 mole %, p is from 0 mole % to about 98 mole %, and q is from 0 mole % to about 50 mole %.

2. The composition of claim 1, wherein R is an acetyl group; X is selected from the group consisting of Formula (III), (IV), and (V); wherein $R_1$ and $R_2$, identically or differently, are a straight chain, branched aliphatic, olefinic, or aromatic group having up to 22 carbon atoms and up to 4 double bonds; wherein n is from about 5 mole % to about 40 mole %, m is from about 60 mole % to about 95 mole %, and p and q is 0 mole %.

3. The composition of claim 1, wherein R is hydrogen; X is selected from the group consisting of Formula (III), (IV), and (V); wherein $R_1$ and $R_2$, identically or differently, are a straight chain, branched aliphatic, olefinic, or aromatic group having up to 22 carbon atoms and up to 4 double bonds; wherein n is from about 0.5 mole % to about 20 mole %, m is from about 0.5 to about 40 mole %, and p is from about 50 mole % to about 95 mole %.

4. The composition of claim 1, wherein the vinyl monomer is selected from the group consisting of acrylamide, methacrylamide, t-butyl acrylamide, N-alkylacrylamide, N-alkylmethacrylamide, N-[3-(propyl)trimethylammonium chloride]acrylamide, N-[3-(propyl)trimethylammonium chloride]methacrylamide, methyl acrylate, alkyl acrylate, methyl methacrylate, alkyl methacrylate, aryl acrylate, aryl methacrylates, [2-(methacryloyloxy)ethyl]-trimethylammonium chloride, N-[3-(dimethylamino)propyl]acrylamide, N-[3-(dimethylamino)propyl]methacrylamide, N-ethylacrylamide, 2-hydroxyethyl acrylate, acrylonitrile, vinylpyridine, 1-vinyl-2-pyrrolidinone, acrylamidopropyltrimethyl ammonium chloride and combinations thereof.

5. The composition of claim 1, wherein the mole ratio of the base polymer of Formula (I) to the vinyl monomer is from about 5:95 to about 50:50.

6. The composition of claim 1, wherein the hydrophobic vinylamine-containing vinyl polymer comprises the base polymer Formula (I), wherein n is from about 10 mole % to about 60 mole %, m is from about 1 mole % to about 90 mole %, p is 0 mole %, and q is 0 mole %; wherein the vinyl monomer is acrylamide; and wherein the mole ratio of the base polymer to acrylamide is from about 5:90 to about 50:50, preferably from about 10:90 to about 30:70.

7. The composition of claim 1, further comprising a surfactant wherein the surfactant is selected from the group consisting of a polyethylene glycol having a molecular weight of less than about 5,000 Daltons, long chain alkyl ethers, alkanolamides, alkoxylated alcohols, amine oxides, ethoxylated amines, alkoxylated amides, EO-PO-block copolymers, alkyl glycidyl ether ends-capped polyethylene glycol, alkoxylated fatty alcohols, alkoxylated fatty acid esters, alkylarylalkoxylates, sorbitan derivatives, polyglyceryl fatty acid esters, alkyl(poly)glucosides, fluorocarbon-based surfactants, softeners and debonders and bis-amide softeners, imidazoline debonders, or quaternary esters, and combinations thereof.

8. The composition of claim 1, wherein R is a hydrogen; X is Formula (II), wherein n is from about 40 mole % to about 90 mole %, m is from about 10 mole % to about 60 mole %, p is 0 mole %, and q is 0 mole %, wherein the vinyl monomer is acrylamide, wherein the mole ratio of the base polymer of Formula (I) to the vinyl monomer is from about 5:95 to about 50:50, and the surfactant is a nonionic surfactant long chain alkyl ethers PEGMO (polyethylene glycol (400 MW) mono-oleate).

9. A process of preparing a hydrophobic vinylamine-containing polymer of Formula (I),

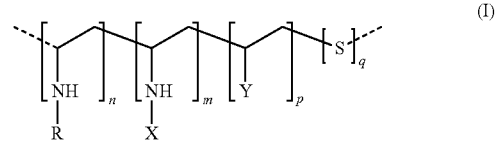

(I)

comprising the step of reacting an aqueous solution or dispersion of vinylamine-containing polymer having an active solids content of between about 1% to about 50%, with a compound selected from the group consisting of a $C_4$ or longer carbon chain hydrophobic alkylating agent and acylating reactive agent; wherein the pH of the aqueous solution or dispersion of vinylamine-containing polymer is in the range of from about 6 to about 12, a reaction temperature of between about 5° C. and about 80° C., and reacted for a period of time of from about 6 minutes to about 8 hours.

10. The process of claim 9, wherein the aqueous solution or dispersion of vinylamine-containing polymer has an active solids content of from about 10% to about 20%, and a pH of from about 8 to about 10, and a temperature of from about 35° C. and about 60° C., and a reaction time of from about 1 hour to about 3 hours.

11. The process of claim 9, wherein the aqueous solution or dispersion of vinylamine-containing polymer is reacted with a compound selected from the group consisting of a $C_4$ or longer carbon chain hydrophobic alkylating agent and acylating reactive agent.

12. The process of claim 9, wherein the acylating agent is selected from the group consisting of alkyl ketene dimers having 20 to 44 carbon atoms, alkenyl ketene dimers having 20 to 44 carbon atoms, alkenyl succinyl anhydrides having 8 to 28 carbon atoms, and combinations thereof.

13. The process of claim 9, wherein the mole percentage of $C_4$ or longer carbon chain hydrophobic alkylating or acylating agents in the hydrophobic polymers in the hydrophobic polymers is from about 0.05% to about 50%.

14. The process of claim 9, wherein the molecular weight ($M_w$) of the hydrophobic vinylamine-containing polymer is in the range of from about 4,000 Daltons to about 2,000,000 Daltons.

15. A method of making paper comprising:
providing a hydrophobic vinylamine-containing polymer of claim 1;
treating a paper furnish or formed sheet of paper with the hydrophobic vinylamine-containing polymer.

* * * * *